United States Patent
Yoo et al.

(10) Patent No.: US 12,493,425 B2
(45) Date of Patent: Dec. 9, 2025

(54) SYSTEM AND METHOD FOR IMPROVED MEMORY ALLOCATION AND MANAGEMENT

(71) Applicant: SAMSUNG ELECTRONICS CO., LTD., Suwon-si (KR)

(72) Inventors: Hyunjoon Yoo, Suwon-si (KR);
Seo-Hyun Shin, Suwon-si (KR);
Soo-Young Ji, Suwon-si (KR);
Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/597,292

(22) Filed: Mar. 6, 2024

(65) Prior Publication Data
US 2025/0077104 A1    Mar. 6, 2025

(30) Foreign Application Priority Data
Sep. 1, 2023 (KR) .......................... 10-2023-0116150

(51) Int. Cl.
*G06F 3/06* (2006.01)

(52) U.S. Cl.
CPC .......... *G06F 3/0647* (2013.01); *G06F 3/0619* (2013.01); *G06F 3/064* (2013.01); *G06F 3/067* (2013.01)

(58) Field of Classification Search
CPC ...... G06F 3/0647; G06F 3/0619; G06F 3/064; G06F 3/067
See application file for complete search history.

(56) References Cited

U.S. PATENT DOCUMENTS

| | | | |
|---|---|---|---|
| 10,409,720 B2 | 9/2019 | Gorobets et al. | |
| 11,487,455 B2 | 11/2022 | Kannan et al. | |
| 11,537,293 B2* | 12/2022 | Sun | G06F 3/0673 |
| 11,550,481 B2 | 1/2023 | Karr | |
| 11,789,632 B1* | 10/2023 | Ben-Yehuda | G06F 3/0649 711/117 |
| 2009/0106518 A1* | 4/2009 | Dow | G06F 3/0613 711/E12.002 |
| 2016/0005423 A1* | 1/2016 | Neppalli | G11B 20/1258 360/25 |
| 2018/0067687 A1* | 3/2018 | Nakamura | G06F 3/0649 |
| 2018/0129443 A1* | 5/2018 | Karve | G06F 3/0653 |
| 2018/0357160 A1 | 12/2018 | Gorobets et al. | |
| 2020/0174678 A1* | 6/2020 | Hallak | G06F 3/0688 |
| 2021/0208792 A1* | 7/2021 | Peterson | G06F 3/0685 |
| 2021/0326048 A1 | 10/2021 | Karr | |
| 2021/0334215 A1 | 10/2021 | Gole et al. | |

(Continued)

FOREIGN PATENT DOCUMENTS

| | | |
|---|---|---|
| CN | 116069252 A | 5/2023 |
| EP | 4 139 802 A1 | 3/2023 |
| WO | 2021/217021 A1 | 10/2021 |

*Primary Examiner* — Ryan Bertram
(74) *Attorney, Agent, or Firm* — Sughrue Mion, PLLC

(57) ABSTRACT

Provided is a system and method for migrating data. The method includes: receiving data, read count information about the data, and write count information about the data; selecting at least one memory block among a plurality of memory blocks based on a wear level of a plurality of memory blocks and the read count information and the write count information; and storing the data in the at least one memory block.

20 Claims, 17 Drawing Sheets

(56) References Cited

U.S. PATENT DOCUMENTS

| | | | |
|---|---|---|---|
| 2022/0107743 A1* | 4/2022 | Yang | G06F 9/5083 |
| 2022/0197505 A1 | 6/2022 | Kannan et al. | |
| 2022/0261160 A1* | 8/2022 | Sun | G06F 3/0644 |
| 2022/0398201 A1 | 12/2022 | Goto et al. | |
| 2023/0088291 A1* | 3/2023 | Tsuji | G06F 3/0604 |
| | | | 711/154 |
| 2023/0103355 A1 | 4/2023 | Surianarayanan | |

* cited by examiner

| BLK | READ REQUEST | WRITE REQUEST |
|---|---|---|
| BLK1 | 39 | 234 |
| BLK2 | 215 | 201 |
| ⋮ | | |
| BLKz | 362 | 24 |

| ZONE | SIZE OF SUB-ZONE1 | SIZE OF SUB-ZONE2 | BLK IN SUB-ZONE1 | BLK IN SUB-ZONE2 | READ REQUEST FOR SUB-ZONE1 | WRITE REQUEST FOR SUB-ZONE1 |
|---|---|---|---|---|---|---|
| ZONE1 | 12Mb | 24Mb | BLK1, ..., BLK12 | BLK13, ..., BLK36 | 285 | 234 |
| ZONE2 | 5Mb | 31Mb | BLK5, ..., BLK10 | BLK1, ..., BLK4, BLK10, ..., BLK36 | 456 | 752 |
| ... | | | | | | |
| ZONEn | 7Mb | 29Mb | BLK29, ..., BLK36 | BLK1, ..., BLK28 | 362 | 325 |

SYSTEM AND METHOD FOR IMPROVED MEMORY ALLOCATION AND MANAGEMENT

CROSS-REFERENCE TO RELATED APPLICATION

This application claims priority to Korean Patent Application No. 10-2023-0116150, filed in the Korean Intellectual Property Office on Sep. 1, 2023, the entire contents of which are incorporated herein by reference.

BACKGROUND

1. Field

The present disclosure relates to a storage system and an operating method thereof.

2. Description of Related Art

In a data center, hundreds or thousands of computer servers (for example, a web server, a mail server, a file server, a video server, a cloud server, and the like) are installed in one location to provide various stable services to different service users. Data centers may store and provide various data using storage devices such as solid state drives (SSD). SSDs with high processing speed are mainly used to satisfy the quality of service (QOS) provided to clients requesting connection to the data center. Since SSDs have a shorter lifespan than HDDs, a management method for improving the lifespan of SSDs is required.

SUMMARY

The disclosure provides a storage system and an operating method thereof that may perform data migration to reduce wear level differences.

The disclosure also provides a storage system and an operating method thereof that may perform data migration in units of zones.

According to an aspect of the disclosure, a method of migrating data includes: receiving data, read count information about the data, and write count information about the data; selecting at least one memory block among a plurality of memory blocks based on a wear level of a plurality of memory blocks and the read count information and the write count information; and storing the data in the at least one memory block.

According to an aspect of the disclosure, a method of operating a storage device includes: setting a plurality of zones; setting a plurality of sub-zones to each zone of the plurality of zones; allocating, based on read counts and write counts of a plurality of memory blocks, the plurality of memory blocks to the plurality of sub-zones; storing information about the read counts and the write counts corresponding to each of the plurality of sub-zones in a zone management table; receiving a data migration request for at least one zone of the plurality of zones; and transmitting data stored in the at least one zone and information about the read counts and the write counts of the plurality of sub-zones of the at least one zone from the zone management table.

According to an aspect of the disclosure, a storage system includes: a source storage device including a plurality of memory blocks, wherein the source storage device is configured to: allocate the plurality of memory blocks into a plurality of zones, allocate each of the plurality of zones into a plurality of sub-zones, and transmit information about data stored in one zone of the plurality of zones, read counts of the plurality of sub-zones of the one zone; and a source storage server configured to transmit to a target storage device the information about the data stored in the one zone, the read counts, and the write counts of a plurality of sub-zones of the one zone.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 illustrates an example of a read/write (R/W) table according to an embodiment;

FIG. 14 illustrates an example of a zone management table according to an embodiment;

DETAILED DESCRIPTION

Figure 1:
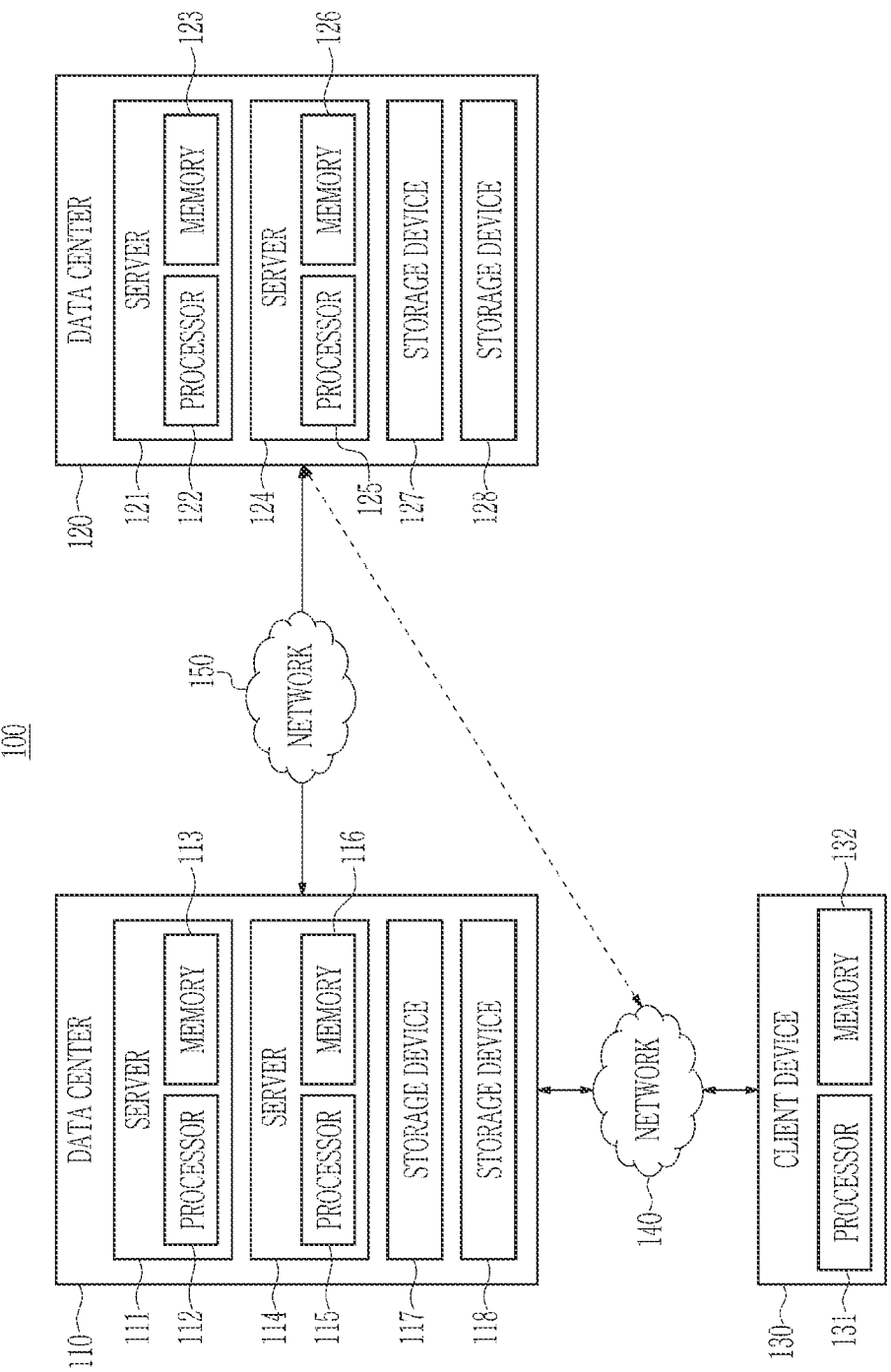
FIG. 1 illustrates a block diagram of a storage system according to an embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless an explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Herein, the expression "at least one of a, b and c" indicates "only a," "only b," "only c," "both a and b," "both a and c," "both b and c," or "all of a, b, and c."

FIG. 1 illustrates a block diagram of a storage system according to an embodiment.

Referring to FIG. 1, a storage system 100 may include a plurality of computing devices such as servers 111, 114, 121, and 124 connected to networks 140 and 150. For example, the servers 111, 114, 121, and 124 may be part of a cloud computing system operated by a service provider. The storage system 100 may include at least one storage device, such as storage devices 117 and 118 and storage devices 127 and 128. The storage system 100 may include at least one client computing device, such as a client device 130 that may communicate with the servers 111, 114, 121, and 124 through the networks 140 and 150. The servers 111, 114, 121, and 124 and the storage devices 117, 118, 127, and 128 may be maintained by a service provider in at least one data center. For example, as shown in FIG. 1, the servers 111 and 114 and the storage devices 117 and 118 may be disposed in the data center 110, and the servers 121 and 124 and the storage devices 127 and 128 may be disposed in another data center 120. The data center 110 and 120 and/or the servers 111, 114, 121, and 124 may be located in different cities, states, countries, continents, and the like separated by a considerable distance from each other. In addition, there may be at least one region or zone within data centers 110 and 120. For example, a region or zone may be logically partitioned based on appropriate attributes.

The servers 111, 114, 121, and 124 may be configured similarly to each other. For example, as shown, the server 111 may include at least one processor 112, memory 113, and other components present in a typical general-purpose computer. The memory 113 may store information accessible by the processor 112, and includes instructions that may be executed by the processor 112. The memory 113 may include data that may be retrieved, manipulated, or stored by the processor 112. The memory 113 may be a type of non-transitory computer-readable medium that may store information accessible by the processor 112, such as an HDD, an SSD, a tape drive, an optical storage, a memory card, a read-only memory (ROM), a random access memory (RAM), a DVD, a CD-ROM, and a writable and read-only memory. The processor 112 may be a well-known processor or another type of processor that is less well-known. Alternatively, the processor 112 may be a dedicated controller such as a graphics processing unit (GPU) or an application-specific integrated circuit (ASIC), such as a tensor processing unit (TPU) or a neural processing unit (NPU).

Although FIG. 1 functionally illustrates that the processor 112 and the memory 113 are within the same block, the processor 112 and the memory 113 may actually include a plurality of processors and memories that may or may not be stored in the same physical housing. The processor 112 may include a set of processors that may or may not operate in parallel. The servers 111, 114, 121, 124 may respectively include at least one internal clock that provides timing information that may be used to measure time for operations and programs executed by the servers 111, 114, 121, and 124.

The servers 111, 114, 121, and 124 include a direct attached storage (DAS), a network attached storage (NAS), a storage area network (SAN), a fiber channel (FC), a fiber channel over ethernet (FCOE), and a mixed architecture network, but are not limited thereto, and may be implemented by various architectures and technologies:

In one or more embodiments, the servers 111, 114, 121, and 124 may be a virtualized environment.

The client device 130 may include a processor 131 and a memory 132, and may be configured similarly to the servers 111, 114, 121, and 124. The client device 130 may have all components generally used in relation to personal computing devices such as memories (for example, RAM and internal hard drives), input and/or output devices, sensors, and/or output devices, sensors, clocks. The client device 130 may include a personal computing device, or alternatively, may include a mobile computing device capable of wirelessly exchanging data with a server through a network such as the Internet. For example, the client device 130 may be a device such as a desktop or laptop computer, a mobile phone or wirelessly supported PDA, a tablet PC, a netbook or a wearable computing device that may obtain information through the Internet.

The servers 111, 114, 121, and 124 and the client device 130 may communicate directly and indirectly through the networks 140 and 150. For example, by using an Internet socket, the client device 130 may connect to services operating on the remote servers 111, 114, 121, and 124 through an Internet protocol suite. The servers 111, 114, 121, and 124 may set a listening socket capable of accepting an initial connection for transmitting and receiving information. The networks 140 and 150 and the intervening node may include the Internet, World Wide Web, intranet, virtual private network, wide area network, local network, private network using communication protocols proprietary to at least one company, Ethernet, WiFi (for example, 802.81, 802.81b, g, n, or other standards), and various configurations and protocols including HTTP and various combinations thereof.

Data migration between the data centers 110 and 120 or data migration between the storage devices 117 and 118 located in different areas within the data center 110 may be required. For example, the client device 130 and the data center 110 may be located in the same city, state, country, or continent. The client device 130 and the data center 120 may be located in different cities, states, countries, or continents. The data center 120 may migrate user data provided to the client device 130 to the data center 110. The client device 130 may receive services from the data center 110 located in the same area, and fast data access is possible.

Figure 2:
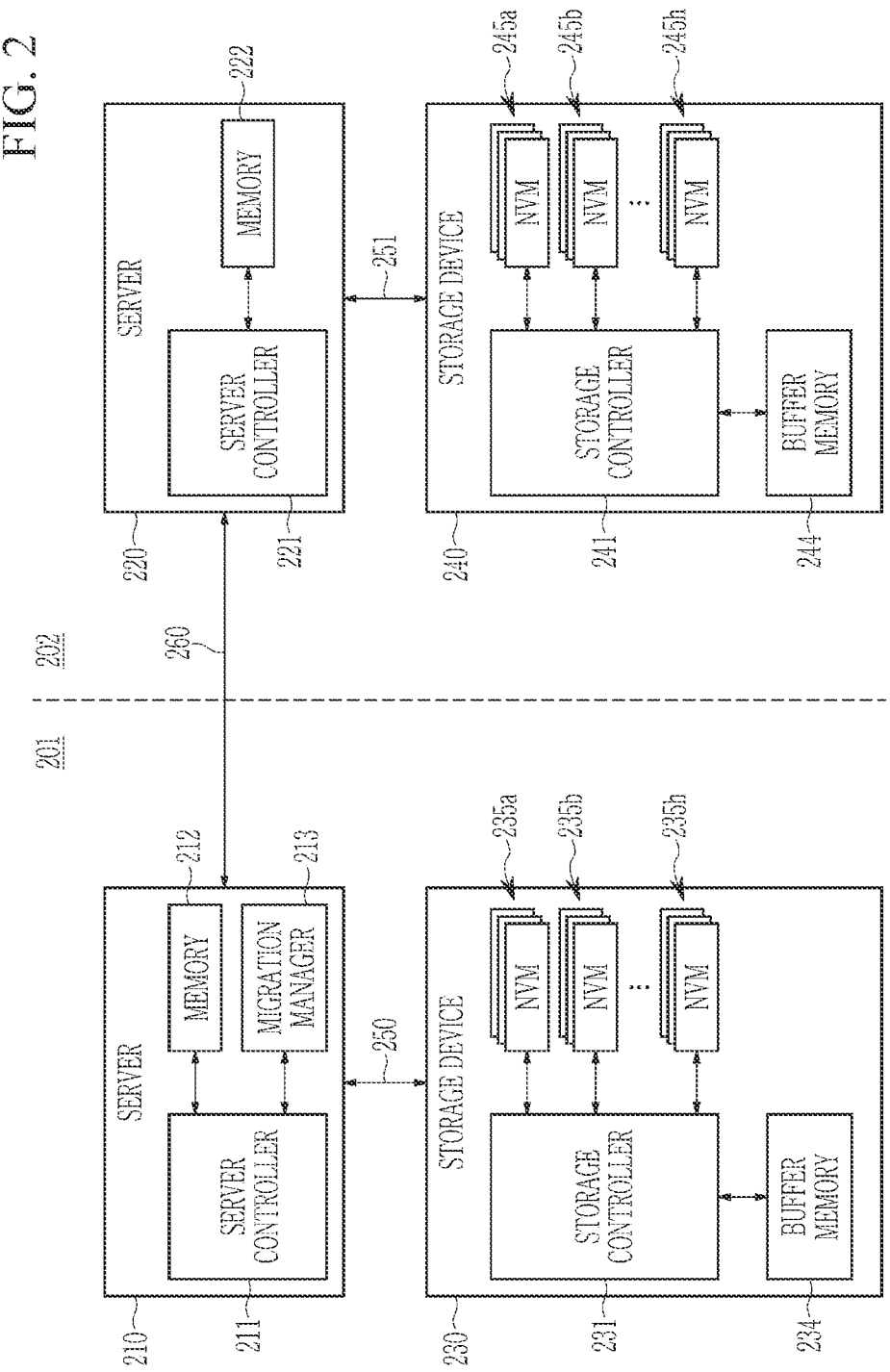
FIG. 2 illustrates a block diagram of an example of a server and a storage device included in a data center according to an embodiment.

FIG. 2 illustrates a block diagram of an example of a server and a storage device included in a data center according to an embodiment.

Referring to FIG. 2, a data center 201 and a data center 202 may be located in different regions. The data center 201 may include a server 210 and a storage device 230, and the data center 202 may include a server 220 and a storage device 240. Hereinafter, the server 210 and the storage device 230 included in the data center 201 are referred to as the source server 210 and the source storage device 230, and the server 220 and the storage device 240 included in the data center 202 are referred to as the target server 220 and the target storage device 240.

The source server 210 may provide read and write requests from a user application. For example, a user may use an application (for example, a word processing application) and transmit user data writing or user data reading to the source storage device 230.

The source server 210 may include a server controller 211, a memory 212, and a migration manager 213.

The server controller 211 may control an operation of the source server 210 and, for example, may run an operating system (OS). The memory 212 may store instructions and data that are executed and processed by the server controller 211. For example, the operating system running by the server controller 211 may include a file system for file management, and a device driver for controlling peripheral devices including the source storage device 230 at an operating system level.

The migration manager 213 may migrate data from the source storage device 230 connected to the source server 210 to the target storage device 240. The storage device 230 connected to the source server 210 may be positioned within the data center 201. The migration manager 213 may migrate user data of the client device 130 based on the position of the client device 130 (see FIG. 1). For example, the migration manager 213 may migrate user data to the data center 202 located in a region adjacent to the client device 130. In one or more embodiments, the migration manager 213 may migrate user data to the data center 202 according to a migration request from the client device 130. When performing data migration, the migration manager 213 may access the target storage device 240 directly or through the target server 220.

In an embodiment, when performing data migration to another storage device (for example, 240), the migration manager 213 in the source server 210 or the source data center 201 may transmit data and data attribute information to another storage device 240. For example, the migration manager 213 may transmit data and information about the read/write counts of the data to another storage device 240. In one or more embodiments, the migration manager 213 may transmit data together with the read/write counts of at least one of a memory block, a super block, a sub-zone, and a zone in which data is stored.

The source server 210 including the migration manager 213 may be a server with higher access rights to data in the storage system (100 in FIG. 1) than the target server 220. The migration manager 213 may manage a migration operation for copying data from the source storage device 230 to the target storage device 240.

In one or more embodiments, the source server 210 may be connected to (for example, linked) to the target server 220 through a target link 260 of the source server 210. The target link 260 may be implemented with various technologies depending on whether the storage system 100 is implemented through hardware (HW), software (SW), or a combination of HW and SW. For example, it will be understood that the server and the storage device of the system 100 may be implemented through HW, SW, or a combination of HW and SW. For example, in one or more embodiments, the target link 260 may be a physical network connection (for example, Ethernet).

In one or more embodiments, the source server 210 may be linked (for example, connected) to the target storage device 240 through a communication link 251. The source server 210 may communicate with the source storage device 230 through the communication link 250. As an example, the server 210 may communicate with the source storage device 230 and/or the target storage device 240 through various interfaces such as a universal serial bus (USB), a multimediacard (MMC), a peripheral component interconnect-express (PCI-E), an AT Attachment (ATA), a serial AT Attachment (SATA), a parallel AT Attachment (PATA), a small computer system interface (SCSI), a serial attached SCSI (SAS), an enhanced small disk interface (ESDI), an integrated drive electronics (IDE), and a non-volatile memory express (NVMe).

The source storage device 230 may be accessed by the source server 210. The source storage device 230 may include a storage controller 231, a plurality of non-volatile memories (235a, 235b, ..., 235h), and a buffer memory 234. The source storage device 230 may store data or process data in response to instructions from the source server 210. For example, the source storage device 230 may be a solid state drive (SSD), a smart SSD, an embedded multimedia card (eMMC), an embedded universal flash storage (UFS) memory device, a UFS memory card, a compact flash (CF), an secure digital (SD), a micro secure digital (Micro-SD), a mini secure digital (Mini-SD), an extreme Digital (xD), or a memory stick.

The storage controller 231 may control an operation of the source storage device 230. For example, the storage controller 231 may control the operation of the plurality of non-volatile memories (235a, 235b, ..., 235h) based on the command, address, and data received from the source server 210. The storage controller 231 may include an embedded logic for processing requests from a server (for example, the source server 210) to copy (for example, write) data to the source storage device 230.

The plurality of non-volatile memories (235a, 235b, ..., 235h) may store data. For example, the plurality of non-volatile memories (235a, 235b, ..., 235h) may store meta data and other user data.

Each of the plurality of non-volatile memories (235a, 235b, ..., 235h) may include a memory cell array including non-volatile memory cells that may maintain stored data even when the power of the storage device 230 is turned off, and the memory cell array may be divided into a plurality of memory blocks. The plurality of memory blocks may have a 2D horizontal structure in which memory cells are disposed on the same plane (or layer) in two dimensions or a 3D vertical structure in which non-volatile memory cells are disposed in three dimensions. The memory cell may be a single level cell (SLC) that stores one bit of data or a multi-level cell (MLC) that stores two or more bits of data.

However, it is not limited thereto, and each memory cell may be a triple level cell (TLC) storing 3 bits of data or a quadruple level cell (QLC) storing 4 bits of data.

Each of the plurality of non-volatile memories (235a, 235b, ..., 235h) may include a plurality of dies or a plurality of chips, each including a memory cell array. For example, each of the plurality of non-volatile memories (235a, 235b, ..., 235h) may include a plurality of chips, and each of the plurality of chips may include a plurality of dies. In the embodiment, the plurality of non-volatile memories 235a, 235b, ..., 235h may also include a plurality of channels, each of which includes a plurality of chips.

Each of the plurality of non-volatile memories (235a, 235b, ..., 235h) may include a NAND flash memory. In another embodiment, each of the plurality of non-volatile memories (235a, 235b, ..., 235h) may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. Hereinafter, in the present disclosure, it will be described assuming that each of the plurality of non-volatile memories (235a, 235b, ..., 235h) is a NAND flash memory device.

The buffer memory 234 may store commands and data that are executed and processed by the storage controller 231. The buffer memory 234 may temporarily store data stored or to be stored in the plurality of non-volatile memories (235a, 235b, ..., 235h).

The buffer memory 234 may be implemented as a volatile memory such as a dynamic random access memory (DRAM) and a static RAM (SRAM). However, it is not limited thereto, and the buffer memory 234 may be implemented as a resistive non-volatile memory, such as a magnetic RAM (MRAM), a phase change RAM (PRAM), or a resistive RAM (ReRAM), or various types of non-volatile memories, such as a flash memory, a nano floating gate memory (NFGM), a polymer random access memory (PoRAM), or a ferroelectric random access memory (FRAM). In the embodiment of FIG. 2, the buffer memory 234 is shown as being provided outside the storage controller 231, but it is not limited thereto, and the buffer memory 234 may be provided inside the storage controller 231.

The storage controller 231 may manage attribute information of data and transmit attribute information of data to be migrated to the target storage device 240 to the target storage device 240. In one or more embodiments, the storage controller 231 may manage read/write counts for each of the plurality of non-volatile memories (235a, 235b, ..., 235h), and when performing migration, the storage controller 231 may transmit the read/write counts of each of the plurality of non-volatile memories (235a, 235b, ..., 235h) to the target storage device 240. For example, the storage controller 231 may transmit a read/write counts of at least one of a memory block, a super block, a sub-zone, and a zone of a non-volatile memory that stores data for which migration is performed to the target storage device 240, among the plurality of non-volatile memories (235a, 235b, ..., 235h).

In one or more embodiments, the storage controller 231 may set the plurality of non-volatile memories (235a, 235b, ..., 235h) to a plurality of zones. Each of the plurality of zones may be variously defined, and as an example, a size of each zone may be variously defined. For example, each of the plurality of zone may include a plurality of blocks or a plurality of super blocks. In one or more embodiments, each of the plurality of zones may have a size larger than the write or read unit of data. The sizes of the plurality of zones are not limited to the above example, and the sizes of the plurality of zones may be the same or different.

In one or more embodiments, the storage controller 231 may store data sequentially in respective zones. Specifically, the plurality of zones does not store data randomly, but may store data sequentially from the first storage position in each zone. For example, each of the plurality of zones may store data sequentially from the first storage position of each zone when storing data for the first time. In addition, when each of the plurality of zones stores additional data, the storage position at which the data was last written may be checked, and data may be sequentially stored starting from the storage position next to the checked storage position.

Accordingly, the server controller 211 may determine the zone in which data is to be written, and may transmit a write request including a logical address (for example, a logical address indicating the start position of the zone) corresponding to the determined zone to the storage device 230. Then, the storage device 230 may check the zone corresponding to the logical address included in the write request, check the storage position where data was last written in the checked zone, and may sequentially store the received write data starting from a storage position next to the checked storage position. The storage device 230, which sets the storage space into a plurality of zones and sequentially stores data in each zone as described above, may be referred to as a zoned namespaces (ZNS) storage.

In an embodiment, the storage controller 231 may set at least one sub-zone to each of the plurality of zones. For example, the storage controller 231 may set a first sub-zone and a second sub-zone within one zone. The storage controller 231 may allocate at least one memory block or at least one super block to each of at least one sub-zone. In one or more embodiments, the storage controller 231 may allocate a plurality of memory blocks or a plurality of super blocks to at least one sub-zone based on the read/write counts of each of the plurality of memory blocks or the plurality of super blocks. For example, based on the read/write count, the storage controller 231 may allocate a memory block or super block in which read requests are greater than write requests to the first sub-zone, and may allocate a memory block or super block in which write requests are greater than read requests to the second sub-zone. When the number of write requests for any memory block allocated to the first sub-zone exceeds the number of read requests, the storage controller 231 may allocate the memory block to the second sub-zone. In one or more embodiments, the storage controller 231 may store a read/write counts of the first sub-zone and a read/write counts of the second sub-zone based on the read/write request for the first sub-zone and the second sub-zone.

In the embodiment, each of the plurality of zones may store data of the corresponding user. Data migration for user data may be performed in units of zones. In one or more embodiments, when performing data migration in units of zones, the migration manager 213 may transmit read/write counts of sub-zones included in each zone to the target storage device 240. The migration manager 213 may transmit the read/write counts to the target storage device 240 so that the region in which the data stored in the sub-zones will be stored in the plurality of non-volatile memories (245a, 245b, ..., 245h) may be determined with reference to the read/write counts of the sub-zones.

In one or more embodiments, at least one of the servers (for example, the source server 210 and the target server 220) may be a software entity. For example, at least one server may be a virtual machine (VM) managed by a hypervisor associated with at least one central processing unit (CPU). Similarly, at least one of the storage devices 230 and 240 may be virtualized and implemented through HW and/or SW technologies. For example, at least one of the storage devices 230 and 240 may be provided by a combination of physical storage devices. For example, there may be a migration from the first virtual machine to the second virtual machine, but both virtual machines may be supported on one physical storage device. For example, it will be understood that various other combinations between the physical and virtual devices may be implemented without departing from the spirit and scope of the present disclosure.

The target server 220 may receive data from the source server 210 and transmit a data write request to the target storage device 240. The target server 220 may transmit the data write request along with attribute information of the data to the target storage device 240.

The target server 220 may include a server controller 221 and a memory 222.

In the embodiment, when data migration from another storage device (for example, 230) is performed, that is, when receiving data from the source storage device 230 and storing data in the target storage device 240, the server controller 221 within the target server 220 or the target data center 202 may transmit data and attribute information about the data together to the target storage device 240. For example, the server controller 221 may transmit data and information about read/write counts of the data to the target storage device 240. In one or more embodiments, the server controller 221 may transmit data together with the read/write counts of at least one of the memory block, super block, sub-zone, and zone in which the data is stored. In addition, the server controller 221 and the memory 222 are the same as or similar to the server controller 211 and the memory 212 of the source server 210, so descriptions thereof will be omitted.

The target server 220 may communicate with the target storage device 240 through the communication link 251. As an example, the target server 220 may communicate with the target storage device 240 through various interfaces such as a universal serial bus (USB), a multimediacard (MMC), a peripheral component interconnect-express (PCI-E), an AT Attachment (ATA), a serial AT Attachment (SATA), a parallel AT Attachment (PATA), a small computer system interface (SCSI), a serial attached SCSI (SAS), an enhanced small disk interface (ESDI), an integrated drive electronics (IDE), and a non-volatile memory express (NVMe).

The target storage device 240 may be accessed by the target server 220. In addition, the target storage device 240 may be accessed by the source server 210. The target storage device 240 may include a storage controller 241, a plurality of non-volatile memories (245a, 245b, . . . , 245h), and a buffer memory 244. The target storage device 240 may store or process data in response to commands from the source server 210 and/or the target server 220.

The storage controller 241 may receive attribute information of data from the source server 210 when the source server 210 directly performs data migration to the storage device 240. The storage controller 241 may refer to the attribute information about the data and store the data in the corresponding area among the plurality of non-volatile memories (245a, 245b, . . . , 245h). The storage controller 241 may compare the attribute information about the data with the wear level of each area of the plurality of non-volatile memories (245a, 245b, . . . , 245h), and may store the data in an area having a wear level corresponding to the attribute information. For example, the storage controller 241 may store data stored in memory blocks, super blocks, sub-zones, and zones with relatively high read counts within the plurality of non-volatile memories (235a, 235b, . . . , 235h) in an area with a relatively high wear level in the plurality of non-volatile memories (245a, 245b, . . . , 245h). The storage controller 241 may store data stored in memory blocks, super blocks, sub-zones, and zones with relatively high write counts within the plurality of non-volatile memories (235a, 235b, . . . , 235h) in an area with a relatively low wear level in the plurality of non-volatile memories (245a, 245b, . . . , 245h). In one or more embodiments, the storage controller 241 may use program/erasure (P/E) cycle information of each area of the non-volatile memories (245a, 245b, . . . , 245h) as a wear level. In addition, the storage controller 241 may use at least one of an on cell count (OCC1), an off cell count (OCC2), a retention time, and the number of error bits of the read data as a wear level. Hereinafter, wear level information will be described as P/E cycle information.

In the embodiment, the storage controller 241 may set the non-volatile memories (245a, 245b, . . . , 245h) to a plurality of zones. The storage controller 241 may divide each of the plurality of zones into a plurality of storage areas based on the wear level. For example, the storage controller 241 may divide one zone into a storage area with a relatively high wear level and a storage area with a relatively low wear level. In one or more embodiments, the storage controller 241 may receive a data migration request in units of zones. The storage controller 241 may determine a zone to store data among the plurality of zones in the non-volatile memories (245a, 245b, . . . , 245h). The storage controller 241 may determine storage areas having a wear level corresponding to the read/write counts of at least one sub-zone among a plurality of storage areas in the determined zone. The storage controller 241 may store data for at least one sub-zone in the plurality of storage areas. For example, the storage controller 241 may store data of the first sub-zone, where the read count is greater than the write count, in an area with a relatively high wear level within the non-volatile memories (245a, 245b, . . . , 245h). The storage controller 241 may store data of the second sub-zone, where the write count is greater than the read count, in an area with a relatively low wear level within the non-volatile memories (245a, 245b, . . . , 245h).

In the embodiment, each of the storage devices 230 and 240 may be a solid state drive (SSD). In another embodiment, each of the storage devices 230 and 240 may be a universal flash storage (UFS), a multi-media card (MMC), or an embedded MMC (eMMC). In another embodiment, each of the storage devices 230 and 240 may be realized as a secure digital (SD) card, a micro SD card, a memory stick, a chip card, a universal serial bus (USB) card, a smart card, a compact flash (CF) card, or a similar form.

In the embodiment, each of the storage devices 230 and 240 may be connected to the servers 210 and 220 through a block accessible interface including buses such as a serial advanced technology attachment (SATA) bus, a small computer small interface (SCSI) bus, a non-volatile memory express (NVMe) bus, serial attached SCSI (SAS) bus, a UFS, and an eMMC, and each of the storage devices 230 and 240 may be accessed in units of blocks by the servers 210 and 220 through the block accessible interface.

Figure 3:
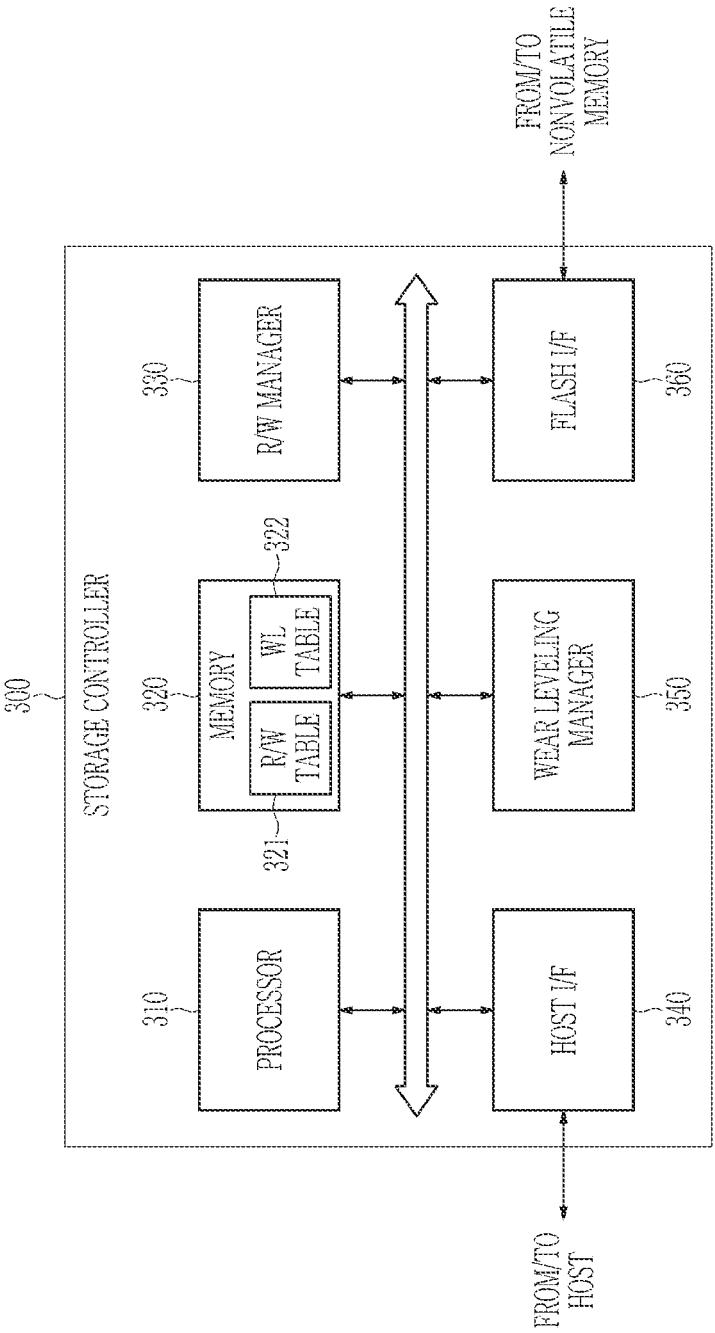
FIG. 3 illustrates a block diagram of an example of a storage controller included in a storage device according to an embodiment.

FIG. 3 illustrates a block diagram of an example of a storage controller included in a storage device according to an embodiment.

Referring to FIG. 3, a storage controller 300 may include at least one processor 310, memory 320, read/write manager 330, host interface circuit 340, wear leveling manager 350, and flash interface circuit 360. In addition, the storage controller 300 may further include a buffer interface circuit that provides an interface between the buffer memories (234 and 244 in FIG. 2).

The processor 310 may control an operation of the storage controller 300 in response to a command received from the server (210 in FIG. 2) through the host interface circuit 340. For example, the processor 310 may control each configuration using firmware for driving the storage device.

The memory 320 may store commands and data that are executed and processed by the processor 310. For example, the memory 320 may be implemented as a volatile memory such as a DRAM or a static RAM (SRAM) or a non-volatile memory such as a PRAM or a flash memory. The memory 320 may store firmware and data for controlling the storage controller 300. The stored firmware and data may be driven or processed by the processor 310. The software hierarchy of the storage controller 300 implemented as firmware may include an interface layer, a flash translation layer (FTL), and the like. In one or more embodiments, the memory 320 may include an R/W table 321 and a wear level information table 322 for each memory block.

When the read/write manager 330 receives a read request for a read target word line, the read/write manager 330 may increase a read count of a memory block including the read target word line. When the read/write manager 330 receives a write request for a write target word line, the read/write manager 330 may increase a write count of a block including the write target word line. The read/write manager 330 may update the read/write count information for each memory block to the memory 320.

The read/write manager 330 may be implemented as software (or firmware) or hardware. Alternatively, the read/write manager 330 may be implemented as a combination of software and hardware. When the read/write manager 330 is implemented as software, the commands of the program configuring the read/write manager 330 may be loaded into the memory 320 and may be executed by the processor 310.

The host interface circuit 340 may provide a physical connection between a host device (for example, a server) and a storage device. That is, the host interface circuit 340 may provide interfacing with the storage device in response to a bus format of the host device. In the embodiment, at least one of various interface methods such as USB, MMC, PCI-E, ATA, SATA, PATA, SCSI, SAS, ESDI, IDE, NVMe, and the like may be applied to the host interface circuit 340.

The wear leveling manager 350 may generate wear level information of the memory block. For example, the wear leveling manager 350 may generate information (OCC1, OCC2, P/E cycle, retention time, and the like) related to the degradation of each of the memory blocks, and the wear leveling manager 350 may update information related to the deterioration a wear level information table 322 for each memory block to the memory 320. For example, the wear leveling manager 350 may count the P/E cycle of each of the memory blocks related to a request from the host device (or the server), and may store the P/E cycle information for each memory block in the memory 320 in the form of a table.

The flash interface circuit 360 may communicate with non-volatile memories. The flash interface circuit 360 may transmit data to the non-volatile memories, and may receive data read from the non-volatile memories. In the embodiment, the flash interface circuit 360 may be connected to the non-volatile memories through one channel. In another embodiment, the flash interface circuit 360 may be connected through the non-volatile memories through a plurality of channels.

The storage controller 300 may further include an error checking and correcting (ECC) engine that performs ECC encoding and ECC decoding using coded modulation such as a Bose-Chaudhuri-Hocquenghem (BCH) code, a low density parity check (LDPC) code, a turbo code, a reed-Solomon code, a convolution code, a recursive systematic code (RSC), a Trellis-coded modulation (TCM), and a block coded modulation (BCM), or other error correction codes.

In one or more embodiments, the storage controller 300 may transmit data stored in the non-volatile memory to the host device. The storage controller 300 may read the read/write count information of the memory block in which data is stored from the R/W table 321, and may transmit the read/write count information of the memory block in which the data is stored as data and data attribute information to the host device.

Figure 4:
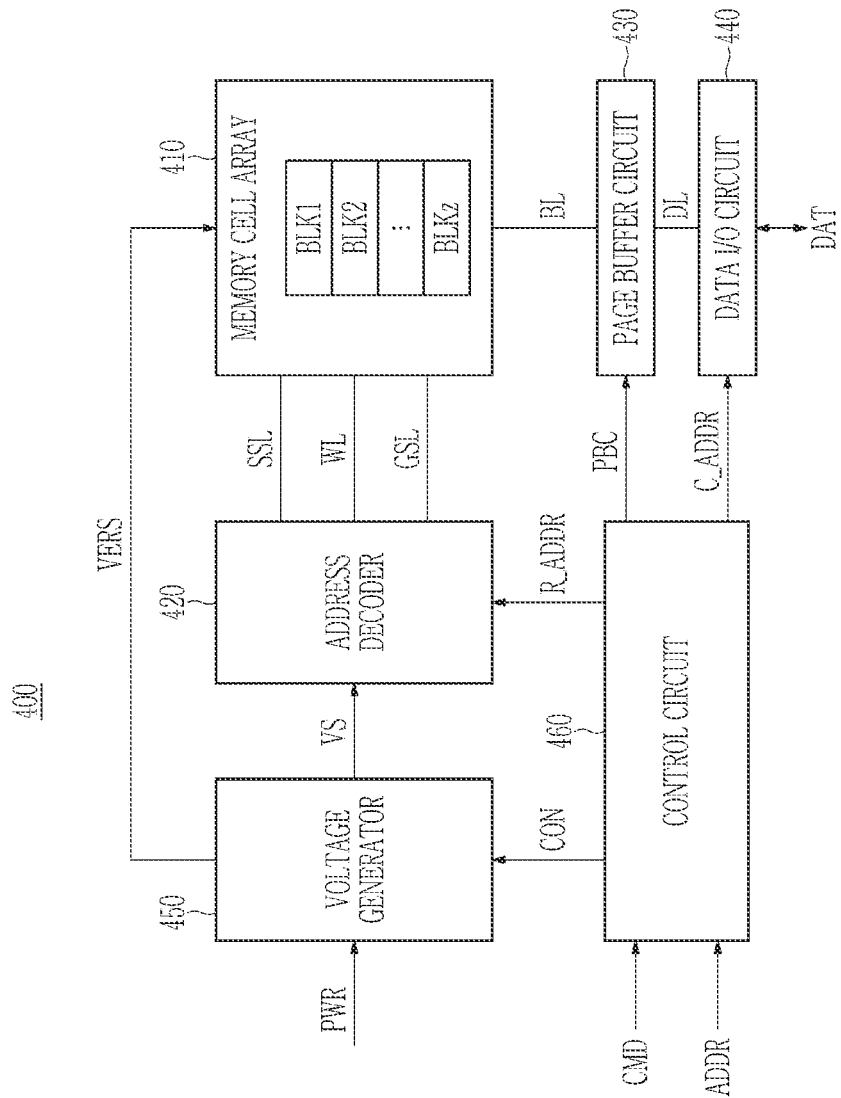
FIG. 4 illustrates a block diagram of an example of a non-volatile memory included in a storage device according to an embodiment.

FIG. 4 illustrates a block diagram of an example of a non-volatile memory included in a storage device according to an embodiment.

Referring to FIG. 4, a non-volatile memory 400 includes a memory cell array 410, an address decoder 420, a page buffer circuit 430, a data input/output circuit 440, a voltage generator 450, and a control circuit 460. For example, the non-volatile memory 400 may be one of the non-volatile memories (435a, 235b, . . . , 235h) shown in FIG. 1.

The memory cell array 410 is connected to the address decoder 420 through a plurality of string selection lines SSL, a plurality of word lines WL, and a plurality of ground selection lines GSL. In addition, the memory cell array 410 is connected to the page buffer circuit 430 through a plurality of bit lines BL. The memory cell array 410 may include a plurality of memory cells connected to the plurality of word lines WL and the plurality of bit lines BL. The memory cell array 410 may be divided into a plurality of memory blocks (BLK1, BLK2, . . . , BLKz), each including memory cells. In addition, each of the plurality of memory blocks BLK1 to BLKz may be divided into a plurality of pages.

In one or more embodiments, the memory cell array 410 may be formed to have a two-dimensional array structure or a three-dimensional vertical array structure.

The control circuit 460 receives a command (CMD) and an address (ADDR) from the outside (for example, the source server 210 and/or the storage controller 231 of FIG. 2), and controls erase loop, program loop, and read operations of the non-volatile memory 400 based on the command (CMD) and address (ADDR). Here, the program loop may include a program operation and a program verification operation, and the erase loop may include an erase operation and an erase verification operation. Here, the read operation may include a normal read operation and a data recovery read operation.

For example, the control circuit 460 may generate control signals CON for controlling the voltage generator 450 and control signals PBC for controlling the page buffer circuit 430 based on the command CMD, and may generate a row address R_ADDR and a column address C_ADDR based on the address ADDR. The control circuit 460 may provide the row address R_ADDR to the address decoder 420 and the column address C_ADDR to the data input/output circuit 440.

The address decoder 420 is connected to the memory cell array 410 through the plurality of string selection lines SSL, the plurality of word lines WL, and the plurality of ground selection lines GSL.

For example, during erase/program/read operations, the address decoder 420 may determine at least one of the plurality of word lines WL as a selected word line in response to the row address R_ADDR, and may determine the remaining word lines of the plurality of word lines WL excluding the selected word line as non-selected word lines.

In addition, during the erase/program/read operations, the address decoder 420 may determine at least one of the plurality of string selection lines SSL as a selected string selection line, and may determine the remaining string selection lines as non-selected string selection lines.

In addition, during the erase/program/read operations, the address decoder 420 may determine at least one of the plurality of ground selection lines GSL as a selected ground selection line in response to the row address R_ADDR, and may determine the remaining ground selection lines as non-selected ground selection lines.

The voltage generator 450 may generate voltages VS required for the operation of the non-volatile memory 400 based on a power voltage PWR and the control signals CON. The voltages VS may be applied to the plurality of string selection lines SSL, the plurality of word lines WL, and the plurality of ground selection lines (GSL) through the address decoder 420. In addition, the voltage generator 450 may generate the erase voltage VERS required for an erase operation based on the power voltage PWR and the control signals CON. The erase voltage VERS may be directly applied to the memory cell array 410 or may be applied thereto through the bit line BL.

The page buffer circuit 430 may be connected to the memory cell array 410 through the plurality of bit lines BL. The page buffer circuit 430 may include a plurality of page buffers. In the embodiment, one bit line may be connected to one page buffer. In another embodiment, two or more bit lines may be connected to one page buffer.

The page buffer circuit 430 may store write data DAT to be programmed in the memory cell array 410 or read data DAT sensed from the memory cell array 410. That is, the page buffer circuit 430 may operate as a write driver or a sense amplifier depending on an operation mode of the non-volatile memory 400.

The data input/output circuit 440 may be connected to the page buffer circuit 430 through the data lines DL. The data input/output circuit 440 may provide the write data DAT to the memory cell array 410 through the page buffer circuit 430 or may provide the read data outputted from the memory cell DAT array 410 through the page buffer circuit 430 to the outside, in response to the column address C_ADDR.

FIG. 5 illustrates an example of a read/write (R/W) table according to an embodiment.

Referring to FIG. 5, an R/W table 500 may include identification information for each of the plurality of memory blocks and read/write count information for each of the plurality of memory blocks. The read count information may include the number of times a read request is received, and the write count information may include information about the number of times a write request is received. In one or more embodiments, the number of read requests received for each of the plurality of memory blocks may be the total number of times read operations are performed on the word lines included in each of the plurality of memory blocks. The number of write requests received for each of the plurality of memory blocks may be the total number of times write operations are performed on the word lines included in each of the plurality of memory blocks. In one or more embodiments, the R/W table 500 may further include information about the number of erases or read errors for each of the plurality of memory blocks.

Figure 6:
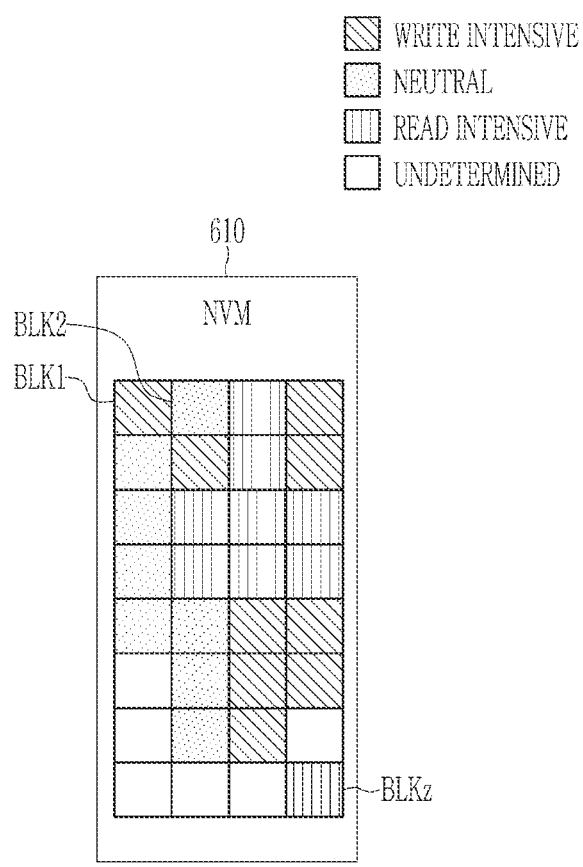
FIG. 6 illustrates a block diagram of an R/W level for each memory cell block of a non-volatile memory according to an embodiment.

FIG. 6 illustrates a block diagram of an R/W level for each memory cell block of a non-volatile memory according to an embodiment.

Referring to FIG. 6, a non-volatile memory 610 may include a plurality of memory blocks (BLK1, BLK2, . . . , BLKz). Each of the plurality of memory blocks (BLK1, BLK2, . . . , BLKz) may be determined to be one of a plurality of read/write levels according to the read/write count information. For example, each of the plurality of memory blocks (BLK1, BLK2, . . . , BLKz) may be determined to be one of the plurality of read/write levels depending on whether a difference between the number of read requests received and the number of write requests received exceeds a threshold.

Referring to FIG. 5 and FIG. 6 together, for the memory block BLK1, since the number of read requests received is 39 and the number of write requests received is 234, the number of write requests received is greater than the number of read requests received, and the difference between the number of read requests received and the number of write requests received exceeds a threshold (for example, 100). Accordingly, the memory block BLK1 may be determined as a first level (WRITE INTENSIVE) of the plurality of read/write levels. For the memory block BLK2, since the number of read requests received is 215 and the number of write requests received is 201, the difference between the number of read requests received and the number of write requests received is less than the threshold. Accordingly, the memory block BLK2 may be determined as a second level (NEUTRAL) of the plurality of read/write levels. For the memory block BLKz, since the number of read requests received is 362 and the number of write requests received is 24, the number of read requests received is greater than the number of write requests received, and the difference between the number of read requests received and the number of write requests received exceeds the threshold (for example, 100). Accordingly, the memory block BLKz may be determined as a third level (READ INTENSIVE) of the plurality of read/write levels. In addition, a memory block on which the read/write operation has not been performed may be determined to be a fourth level (UNDETERMINED) of the plurality of read/write levels.

Figure 7:
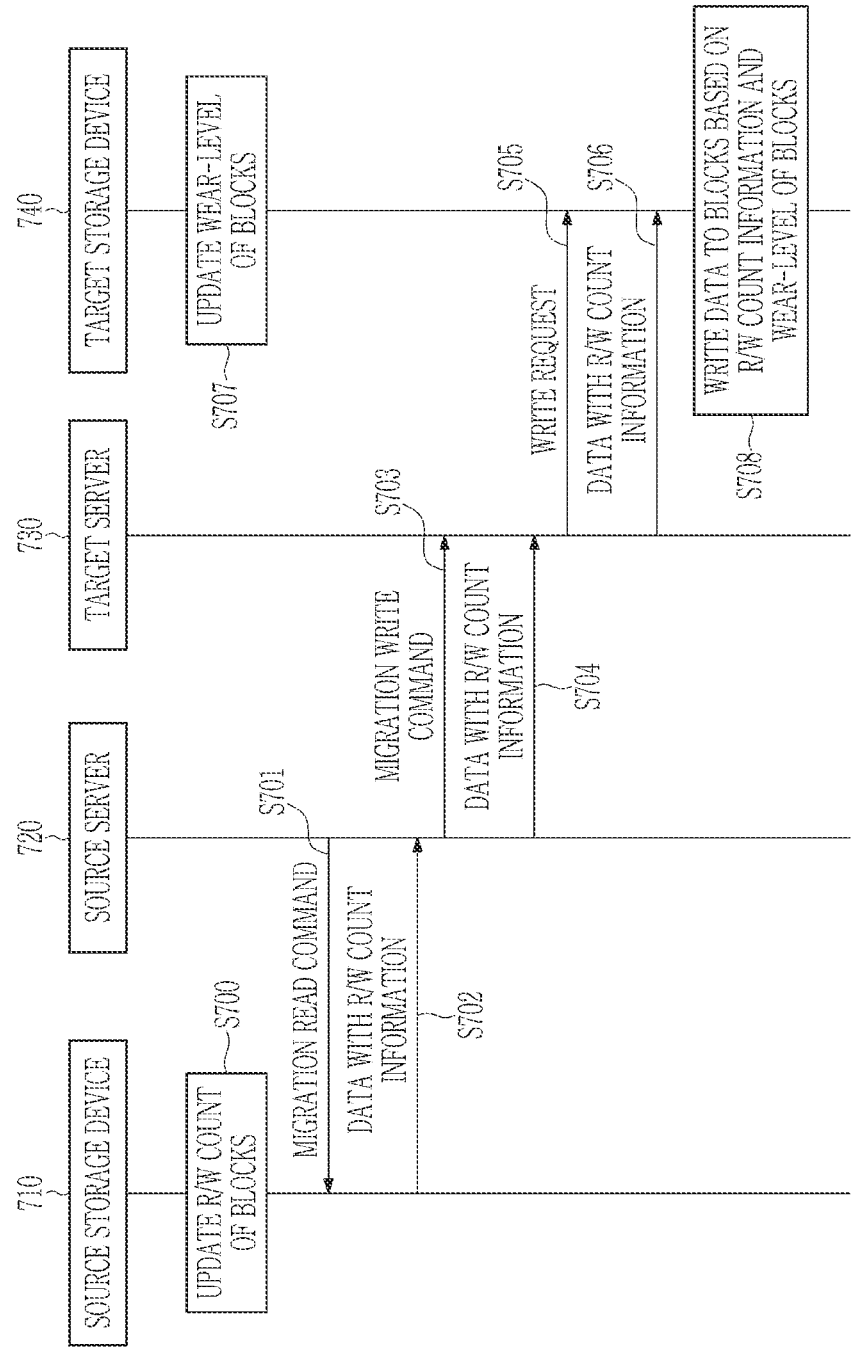
FIG. 7 illustrates a flowchart of a data migration method of a storage system according to an embodiment.

FIG. 7 illustrates a flowchart of a data migration method of a storage system according to an embodiment.

Referring to FIG. 7, a source storage device 710 updates the read/write counts of the memory blocks (S700). The source storage device 710 may update the read/write counts of each of the memory blocks based on the number of read/write requests received for each of the memory blocks. For example, when a read or write request for a word line or page included in the first memory block is received, the R/W manager (330 in FIG. 3) of the source storage device 710 may updates the R/W table 321 by increasing the number of receptions of a read request or write request corresponding to the first memory block of the R/W table (321 in FIG. 3) stored in the memory (320 in FIG. 3).

A source server 720 transmits a migration read command to the source storage device 710 (S701). The source server 720 may migrate data stored in the source storage device 710 to a target storage device 740 in response to user requests and changes in the network environment. The migration manager (213 in FIG. 2) of the source server 720 may generate a migration read command for reading data stored in the source storage device 710. The migration manager 213 may transmit the migration read command and the address of data to be migrated to the source storage device 710.

The source storage device 710 transmits data to be migrated and read/write count information of the memory block in which the data is stored to the source server 720 according to the migration command (S702). The R/W manager 330 of the source storage device 710 may determine the memory block in which the data is stored based on the address of the data, and may read the read/write count information of the memory block determined from the R/W table 321 of the memory 320. The source storage device 710 may read data from the non-volatile memory and transmit the data and read/write count information to the source server 720.

The source server 720 transmits a migration write command to a target server 730 (S703). In addition, the source server 720 transmits the data and read/write count information to the target server 730 (S704).

The target server 730 generates a write request according to the migration write command and transmits the write request to the target storage device 740 (S705). In addition, the target server 730 transmits the data and read/write count information to the target storage device 740 (S706). In one or more embodiments, the source server 720 may directly transmit the migration write command and the data and read/write count information to the target storage device 740.

The target storage device 740 updates a wear level of the memory blocks (S707). For example, the wear leveling manager (350 in FIG. 3) of the target storage device 740 may count the P/E cycle for each memory block, and may store the P/E cycle for each memory block in the memory 320 in a table format.

The target storage device 740 stores data in the memory block based on the read/write count information and the wear level of the memory blocks. The target storage device 740 may divide the memory blocks into the wear levels, and may store data in the memory block(s) having a corresponding wear level by referring to the read/write count information. For example, the target storage device 740 may store data stored in a memory block with a relatively high read count in a memory block with a relatively high wear level, based on the read/write count information. The target storage device 740 may store data stored in a memory block with a relatively high write count in a memory block with a relatively low wear level, based on the read/write count information. Therefore, even when data migration is performed between different storage devices, wear leveling may be performed with reference to attribute information about the data. Operation (S708) will be described with reference to FIG. 8.

Figure 8:
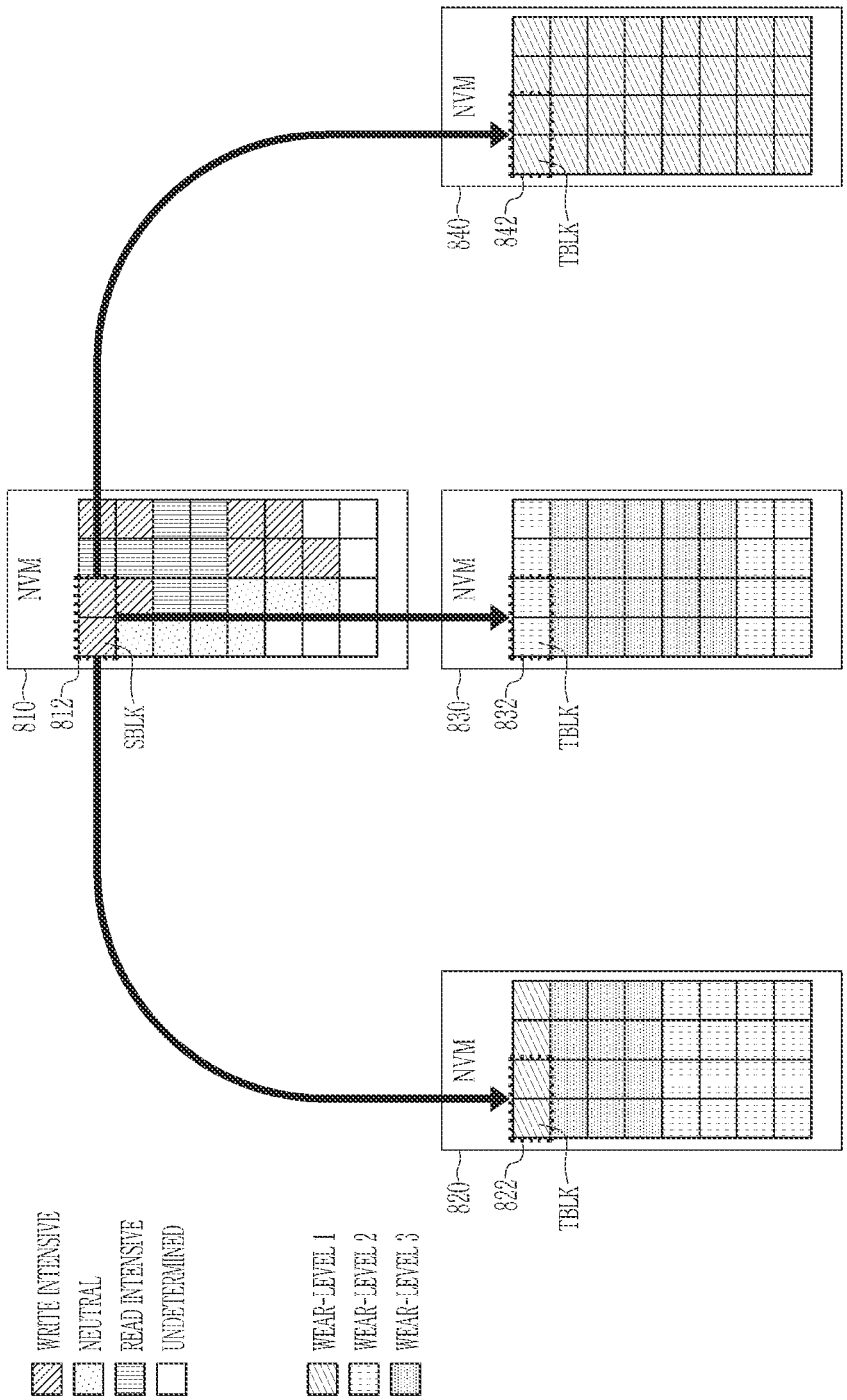
FIG. 8 illustrates a block diagram of a data migration process of a storage system according to an embodiment.

FIG. 8 illustrates a block diagram of a data migration process of a storage system according to an embodiment.

Referring to FIG. 8, data stored in a non-volatile memory 810 of the source storage device may be migrated to the non-volatile memories 820, 830, and 840 of the target story device.

The non-volatile memory 810 may include a plurality of memory blocks SBLK with a plurality of read/write levels (WRITE INTENSIVE, NEUTRAL, READ INTENSIVE, and UNDETERMINED). Among the plurality of memory blocks SBLK, the read/write levels of memory blocks 812 that store data to be migrated may have the first level (WRITE INTENSIVE).

In one or more embodiments, among the plurality of wear levels, the first wear level (WEAR-LEVEL 1) may indicate a state in which relatively little deterioration has progressed, the second wear level (WEAR-LEVEL 2) may indicate a state in which deterioration is more advanced than the first wear level (WEAR-LEVEL 1), and the third wear level (WEAR-LEVEL 3) may indicate a state in which deterioration is more advanced than the second wear level (WEAR-LEVEL 2). For example, the first wear level (WEAR-LEVEL 1) may have a relatively low P/E cycle, the second wear level (WEAR-LEVEL 2) may have a higher P/E cycle compared to the first wear level (WEAR-LEVEL 1), and the third wear level (WEAR-LEVEL 3) may have a higher P/E cycle compared to the second wear level (WEAR-LEVEL 2).

In the embodiment, data stored in memory blocks having the first level (WRITE INTENSIVE) focused on writing among a plurality of read/write levels may be migrated to memory blocks having a wear level indicating a state in which deterioration is less advanced. Data stored in memory blocks having the third level (READ INTENSIVE) focused on reading among a plurality of read/write levels may be migrated to memory blocks having a wear level indicating a state in which deterioration is more advanced.

The non-volatile memory 820 of the target storage device may include a plurality of memory blocks TBLK with a plurality of wear levels (WEAR-LEVEL 1, 2, and 3). When data migration is performed in the non-volatile memory 820, data stored in the memory blocks 812 having the first level (WRITE INTENSIVE) may be stored in memory blocks 822 having the first wear level (WEAR-LEVEL 1) indicating a state in which deterioration is less advanced corresponding to the first level (WRITE INTENSIVE) focusing on writing.

The non-volatile memory 830 of the target storage device may include a plurality of memory blocks TBLK with a plurality of wear levels (WEAR-LEVEL 2 and 3). When data migration is performed in the non-volatile memory 820, data stored in the memory blocks 812 having the first level (WRITE INTENSIVE) may be stored in memory blocks 832 having the second wear level (WEAR-LEVEL 2) indicating a state in which deterioration is less advanced corresponding to the first level (WRITE INTENSIVE) focusing on writing.

The non-volatile memory 840 of the target storage device may include a plurality of memory blocks TBLK with one wear level (WEAR-LEVEL 3). When data migration is performed in the non-volatile memory 840, data stored in memory blocks 812 with the first level (WRITE INTENSIVE) may be stored in memory blocks 842 with the third wear level (WEAR-LEVEL 3).

According to the embodiment, the data stored in the memory blocks focused on reading may be migrated to the memory blocks with a higher wear level, that is, the more deteriorated memory blocks, and the data stored in the memory blocks focused on writing may be migrated to the memory blocks with a lower wear level, that is, the less deteriorated memory blocks. Therefore, wear leveling may be performed even when migrating data between servers.

In the above, it has been described that the read/write level and wear level are managed and data migration between servers is performed, in units of memory blocks, and in one or more embodiments, the storage device may manage the read/write level and wear level and may perform data migration between servers, in units of logical block addresses (LBA) or in units of zones.

Figure 9:
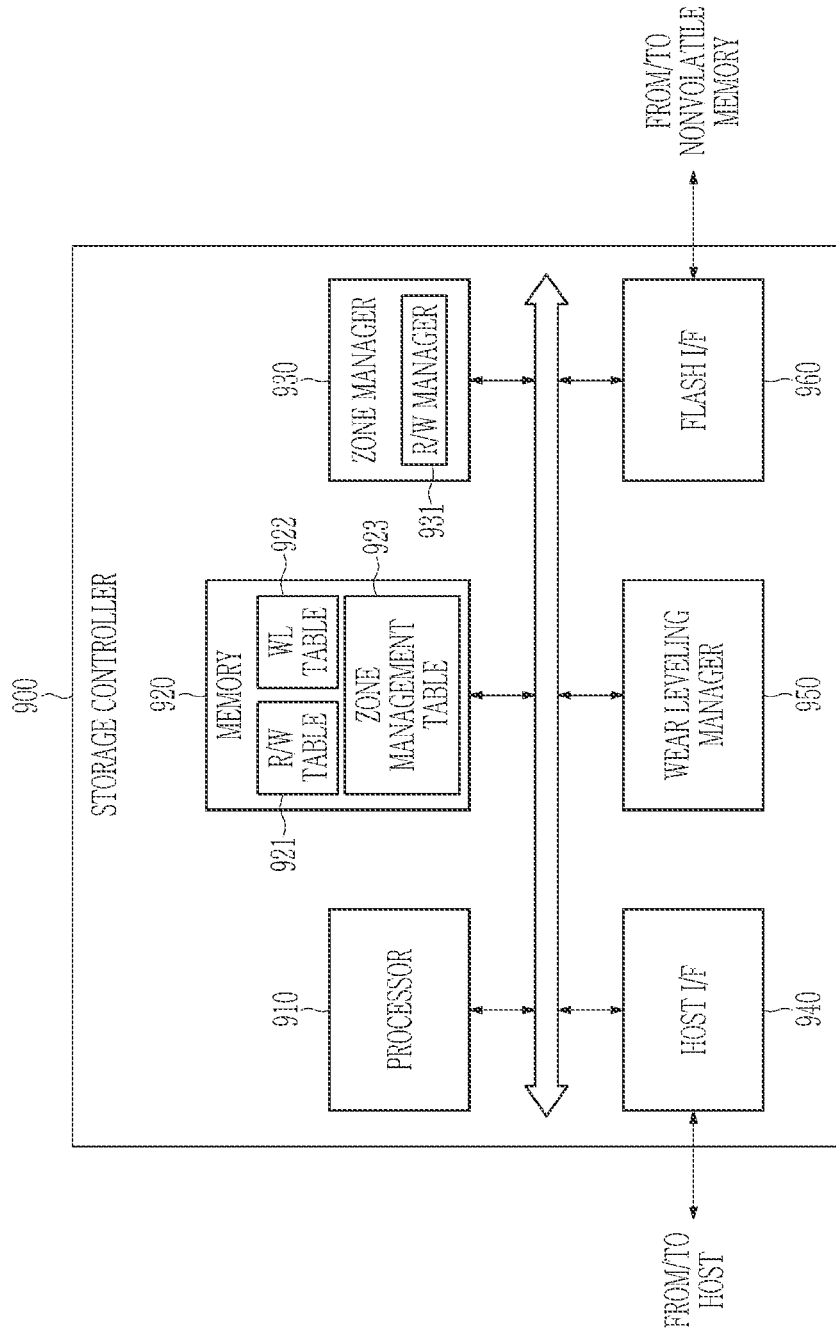
FIG. 9 illustrates a block diagram of an example of a storage controller included in a storage device according to an embodiment.
Figure 10:
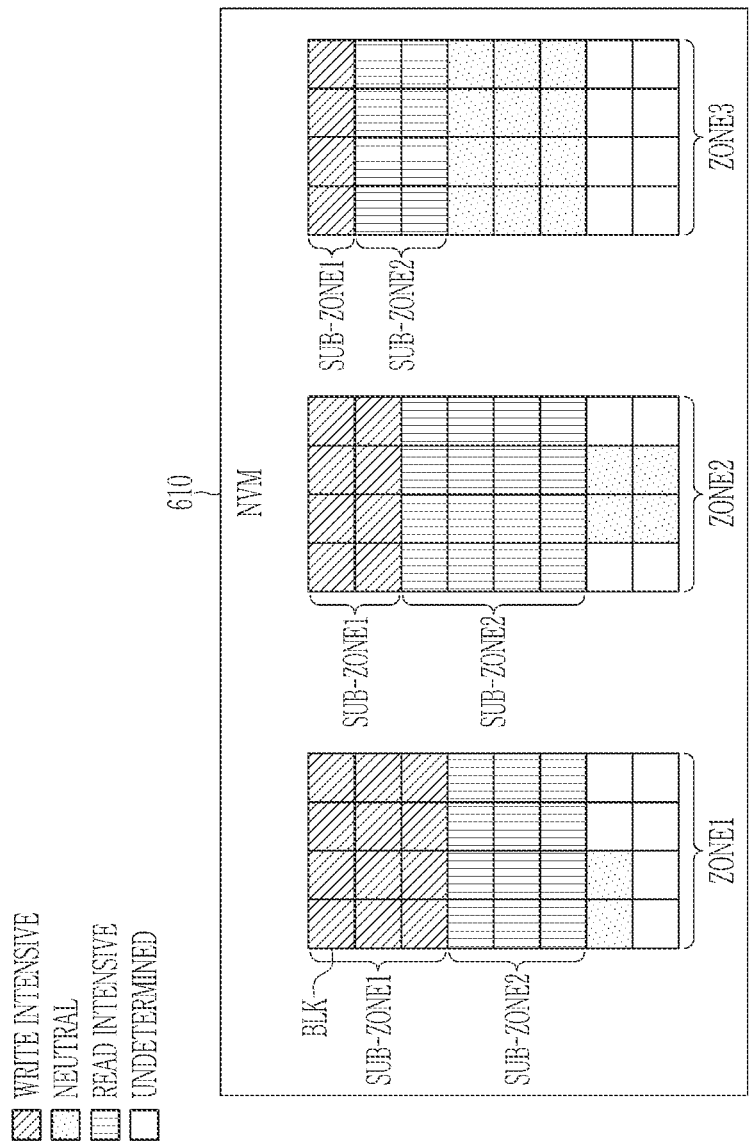
FIG. 10 illustrates a block diagram of an R/W level for each zone of a non-volatile memory according to an embodiment.
Figure 11:
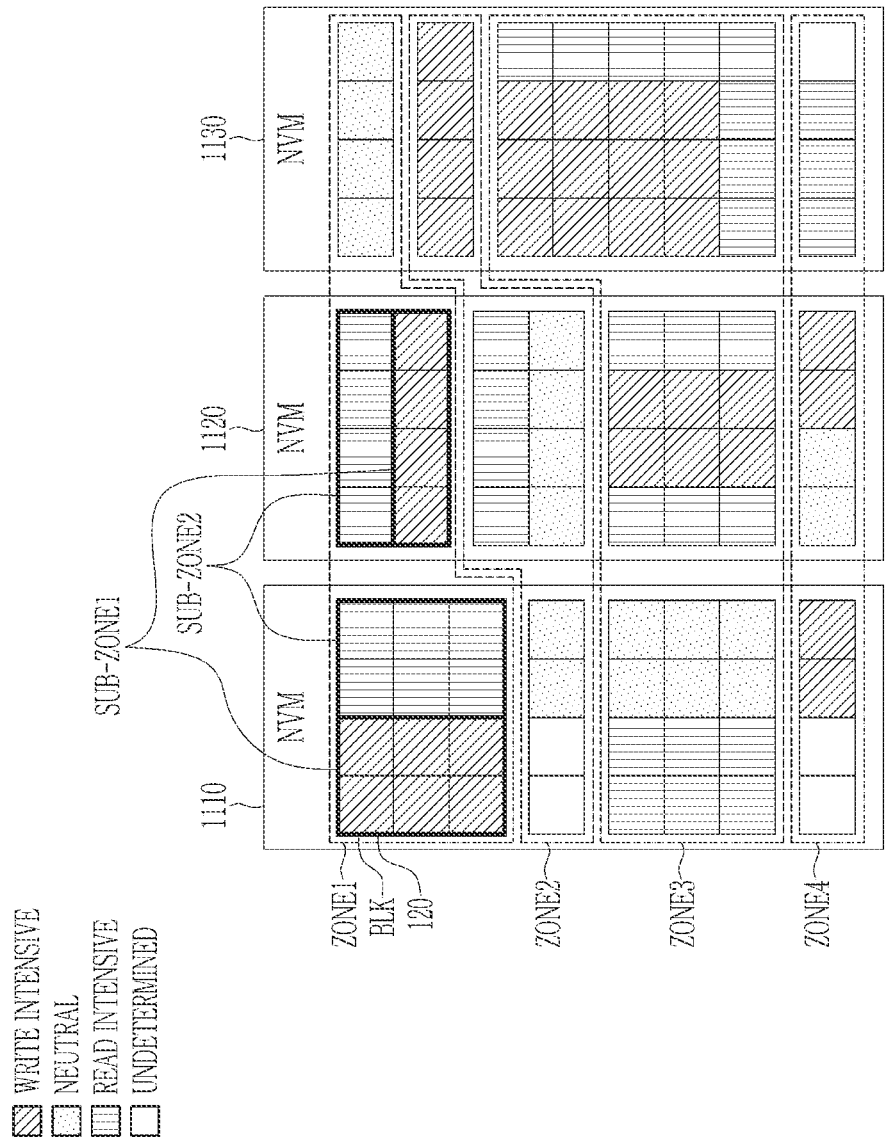
FIG. 11 illustrates a block diagram of an R/W level for each zone of various non-volatile memories according to an embodiment.

FIG. 9 illustrates a block diagram of an example of a storage controller included in a storage device according to an embodiment, FIG. 10 illustrates a block diagram of an R/W level for each zone of a non-volatile memory according to an embodiment, and FIG. 11 illustrates a block diagram of an R/W level for each zone of various non-volatile memories according to an embodiment.

Referring to FIG. 9, a storage controller 900 may include at least one processor 910, memory 920, zone manager 930, host interface circuit 940, wear leveling manager 950, and flash interface circuit 960. In addition, the storage controller 900 may further include a buffer interface circuit that provides an interface between the buffer memories (234 and 244 in FIG. 2). Among constituent elements shown in FIG. 9, descriptions of constituent elements that are the same as or similar to the constituent elements described in FIG. 3 will be omitted.

Referring to FIG. 9 to FIG. 11 together, the zone manager 930 may support functions of managing a plurality of zones of a non-volatile memory 1000 or a plurality of non-volatile memories 1110, 1120, and 1130 and of processing various requests for the plurality of zones. In the embodiment, the zone manager 930 may set a plurality of zones to the non-volatile memory 1000 or the plurality of non-volatile memories 1110, 1120, and 1130, according to a management command received from the host device. For example, as shown in FIG. 10, the zone manager 930 may set a first zone (ZONE1) storing data for the first user, a second zone (ZONE2) storing data for the second user, and a third zone (ZONE3) storing data for the third user, within one non-volatile memory 1000, according to the management command received from the host device. As shown in FIG. 11, the zone manager 930 may set the first zone (ZONE1) storing data for the first user, the second zone (ZONE2) storing data for the second user, the third zone (ZONE3) storing data for the third user, and a fourth zone (ZONE4) storing data for the fourth user, within a plurality of non-volatile memories 1110, 1120, and 1130, according to the management command received from the host device. In one or more embodiments, the zone manager 930 may set a plurality of zones for each application. For example, the zone manager 930 may set the first zone (ZONE1) storing data for the first application, the second zone (ZONE2) storing data for the second application, and the third zone (ZONE3) and the fourth zone (ZONE4) storing data for the third application. In addition, the zone manager 930 may set a plurality of zones for each service provider. In addition, the zone manager 930 may set a plurality of zones based on an arbitrary management reference of the service provider. In one or more embodiments, the zone manager 930 may divide the plurality of zones into a plurality of grades. The zone manager 930 may divide the plurality of zones into a plurality of grades and allocate the plurality of zones for each service provider. For example, service provider A may be allocated a high-grade zone, and service provider B may be allocated a low-grade zone. The above example is only an example of a method for setting the non-volatile memory 1000 or the plurality of non-volatile memories 1110, 1120, and 1130 to the plurality of zones, and the present disclosure is not limited thereto.

The zone manager 930 may set the plurality of zones in units such as the memory blocks and the super blocks. The sizes of the plurality of zones may be the same or different. The zone manager 930 may set at least one sub-zone within the plurality of zones. In one or more embodiments, the zone manager 930 may set at least one sub-zone based on the read/write count information of the memory blocks included in each of the plurality of zones. Referring to FIG. 10, each of the plurality of zones (ZONE1, ZONE2, and ZONE3) may include at least one sub-zone (SUB-ZONE1 or SUB-ZONE2). Referring to FIG. 11, each of the plurality of zones (ZONE1, ZONE2, ZONE3, and ZONE4) may include at least one sub-zone (SUB-ZONE1 or SUB-ZONE2).

The zone manager 930 may provide information about the zone in which data will be stored to a flash translation layer (FTL), and based on this, the flash translation layer may convert the logical address of data into a physical address. In the embodiment, logical addresses may be allocated to data, and the flash translation layer may translate the logical addresses of data to be stored into continuous physical addresses within a zone determined by the zone manager 930. The flash translation layer may transmit the translated physical address to the zone manager 930, and the zone manager 930 may control the non-volatile memory to store data in the received physical address.

In one or more embodiments, the number of the memory blocks included in at least one sub-zone may be changed based on the read/write count information of the memory blocks. Referring to FIG. 10, like the second zone (ZONE2) and the third zone (ZONE3), when the memory blocks BLK with a relatively high read count, that is, the memory blocks BLK with the third level (READ INTENSIVE) focused on reading are more than the memory blocks BLK with a relatively high write count, that is, the memory blocks BLK with the first level (WRITE INTENSIVE) focused on writing, the number of the memory blocks allocated to the second sub-zone (SUB-ZONE2) may be greater than the number of the memory blocks allocated to the first sub-zone (SUB-ZONE1). For example, the zone manager 930 may allocate the memory blocks with a relatively high write count to the first sub-zone (SUB-ZONE1), and the memory blocks with a relatively high read count to the second sub-zone (SUB-ZONE2). This will be described with reference to FIG. 12 and FIG. 13.

Figure 12:
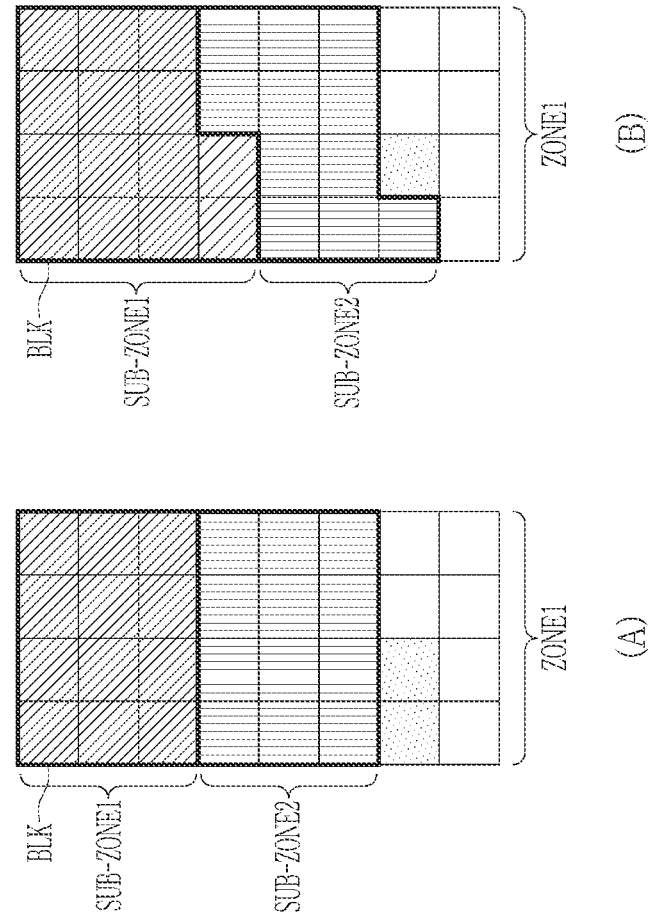
FIG. 12 illustrates a block diagram of a process of changing an R/W level for each zone of a non-volatile memory according to an embodiment'
Figure 13:
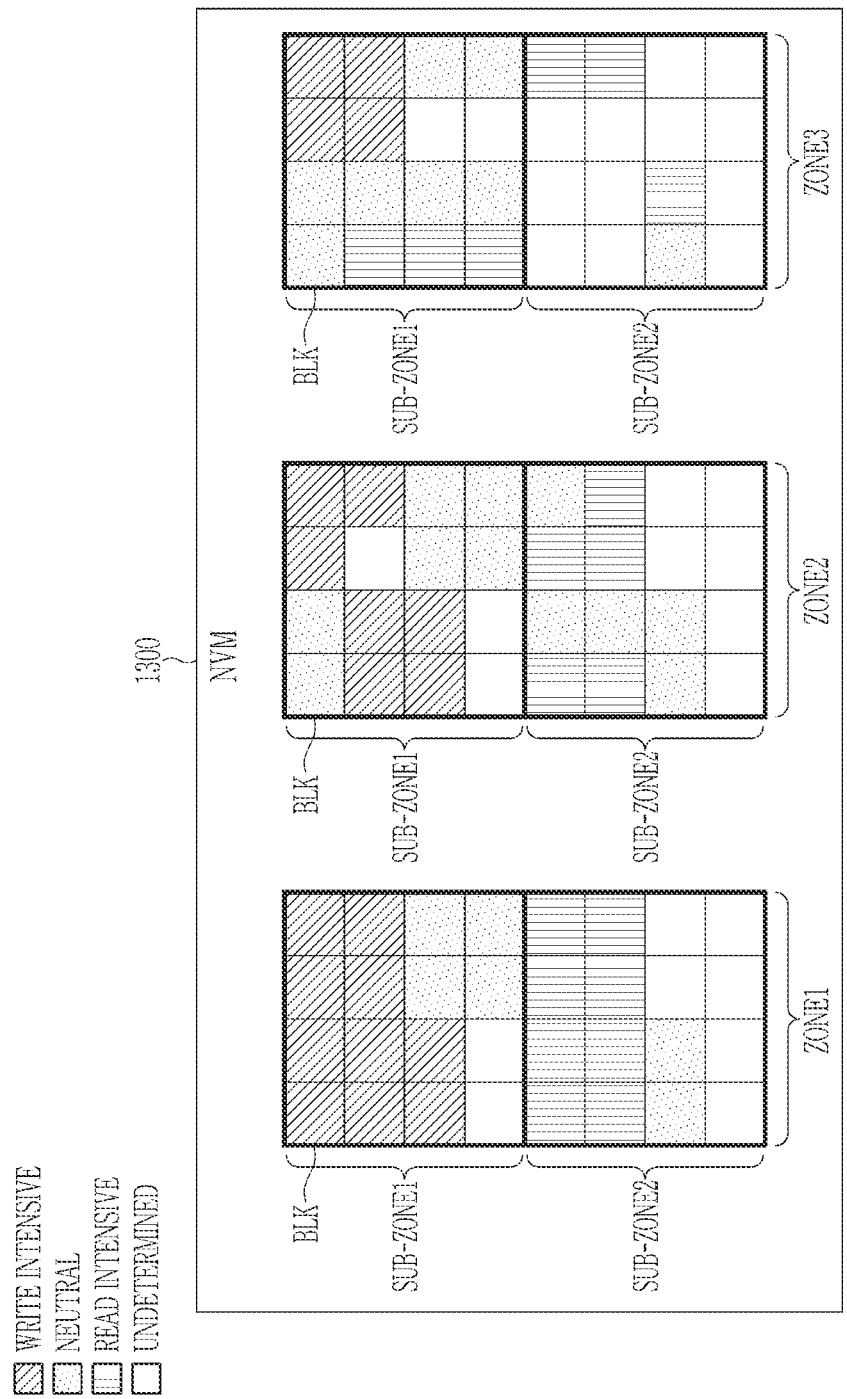
FIG. 13 illustrates a block diagram of an R/W level for each zone of a non-volatile memory according to an embodiment.

FIG. 12 illustrates a block diagram of a process of changing an R/W level for each zone of a non-volatile memory according to an embodiment, and FIG. 13 illustrates a block diagram of an R/W level for each zone of a non-volatile memory according to an embodiment.

As shown in FIG. 12(A), the first zone (ZONE1) may include a plurality of memory blocks BLK. The plurality of memory blocks BLK may be allocated to one of the first sub-zone (SUB-ZONE1) and the second sub-zone (SUB-ZONE2). In one or more embodiments, some of the memory blocks BLK may not be allocated to the first sub-zone (SUB-ZONE1) and the second sub-zone (SUB-ZONE2). The number of the memory blocks allocated to the first sub-zone (SUB-ZONE1) and the second sub-zone (SUB-ZONE2) may be the same.

As shown in FIG. 12(B), the first zone (ZONE1) may include a plurality of memory blocks BLK. The plurality of memory blocks BLK may be allocated to one of the first sub-zone (SUB-ZONE1) and the second sub-zone (SUB-ZONE2). In one or more embodiments, some of the memory blocks BLK may not be allocated to the first sub-zone (SUB-ZONE1) and the second sub-zone (SUB-ZONE2).

Compared to the first sub-zone (SUB-ZONE1) shown in FIG. 12(A), the number of memory blocks allocated to the first sub-zone (SUB-ZONE1) shown in FIG. 12(B) may increase. For example, the zone manager 930 may determine the read/write level of the memory blocks BLK with relatively high read counts among the plurality of memory blocks BLK as the first level (WRITE INTENSIVE) at a specific time or at a specific cycle, and may allocate the memory blocks BLK having the first level (WRITE INTENSIVE) to the first sub-zone (SUB-ZONE1). Compared to the second sub-zone (SUB-ZONE2) shown in FIG. 12(A), the number of memory blocks allocated to the second sub-zone (SUB-ZONE2) shown in FIG. 12(B) may decrease. For example, the zone manager 930 may determine the read/write level of the memory blocks BLK with relatively high write counts among the plurality of memory blocks BLK as the third level (READ INTENSIVE) at a specific time or at a specific cycle, and may allocate the memory blocks BLK having the third level (READ INTENSIVE) to the second sub-zone (SUB-ZONE2).

In one or more embodiments, the sizes of at least one sub-zone (SUB-ZONE1 and SUB-ZONE2) within the plurality of zones (ZONE1, ZONE2, and ZONE3) may be the same or different from each other. For example, the number of the memory blocks BLK with the first write-intensive level (WRITE INTENSIVE) included in the first sub-zone (SUB-ZONE1) of the first zone (ZONE1), the first sub-zone (SUB-ZONE1) of the second zone (ZONE2), and the first sub-zone (SUB-ZONE1) of the third zone (ZONE3) may be different.

Referring to FIG. 13, the sizes of the sub-zones of each of the plurality of zones (ZONE1, ZONE2, and ZONE3) within the non-volatile memory 1300 may be the same. For example, the sizes of the first sub-zones (SUB-ZONE1) of each of the plurality of zones (ZONE1, ZONE2, and ZONE3) may be the same, and the sizes of the second sub-zones (SUB-ZONE2) of each of the plurality of zones (ZONE1, ZONE2, and ZONE3) may be the same. In one or more embodiments, the sizes of all sub-zones (SUB-ZONE1 and SUB-ZONE2) of each of the plurality of zones (ZONE1, ZONE2, and ZONE3) may be the same.

The first sub-zone (SUB-ZONE1) may include the memory block BLK with the first level (WRITE INTENSIVE), and the second sub-zone (SUB-ZONE2) may include the memory block BLK with the third level (READ INTENSIVE). Each of the first sub-zone (SUB-ZONE1) and the second sub-zone (SUB-ZONE2) may further include a memory block (BLK) having read/write levels (for example, the second level (NEUTRAL) and the fourth level (UNDETERMINED)) other than the first level (WRITE INTENSIVE) and the third level (READ INTENSIVE).

The storage controller 900 may transmit data to the host device in units of the plurality of zones (ZONE1, ZONE2, and ZONE3) according to the migration read command. For example, the storage controller 900 may transmit data stored in the first zone (ZONE1) to the source server (210 in FIG. 2). In one or more embodiments, the storage controller 900 may transmit information on the sub-zones within the plurality of zones (ZONE1, ZONE2, and ZONE3) together with data stored in the sub-zones. For example, the storage controller 900 may transmit information about the size of each of the sub-zones of the zone to be migrated and about the memory block included in each of the sub-zones along with data from a zone management table 923 of the memory 920. The zone management table 923 will be described with reference to FIG. 14.

FIG. 14 illustrates an example of a zone management table according to an embodiment.

Referring to FIG. 14, a zone management table 1400 may include information on sizes of sub-zones (SIZE OF SUB-ZONE1 and SIZE OF SUB-ZONE2) included in each of a plurality of zones (ZONE1, ZONE2, . . . , ZONEn), memory blocks (BLK IN SUB-ZONE1 and BLK IN SUB-ZONE2) included in the sub-zones, and the number of read/write requests (READ REQUEST FOR SUB-ZONE1 and WRITE REQUEST FOR SUB-ZONE1) for the sub-zones. The number of read/write requests for the sub-zones (READ REQUEST FOR SUB-ZONE1 and WRITE REQUEST FOR SUB-ZONE1) may be determined based on the read/write counts of the memory block when allocating memory blocks to the sub-zones. In one or more embodiments, the zone management table 1400 may further include information about a grade of each of the plurality of zones (ZONE1, ZONE2 . . . , ZONEn).

When there is a migration read request for the first zone (ZONE1), the storage controller 900 may read information about the first zone (ZONE1) from the zone management table 1400, and may transmit information about the first zone (ZONE1) together with the data stored in the first zone (ZONE1) to the host device (ie, server).

In the embodiment, the storage controller 900 may store data received in units of zones in one of the plurality of zones (ZONE1, ZONE2, and ZONE3) according to the migration write command. For example, the storage controller 900 may store data received in units of zones in the first zone (ZONE1). The storage controller 900 may store data stored in sub-zones of the data received in units of zones in storage areas corresponding to each of the sub-zones among a plurality of storage areas in the first zone (ZONE1) based on the information of the sub-zones. For example, the first zone (ZONE1) includes the plurality of storage areas, and the storage controller 900 may store the data stored in the first sub-zone among the data received in units of zones in a storage area corresponding to the first sub-zone among the plurality of storage areas. In addition, the storage controller 900 may store data stored in the second sub-zone among the data received in units of zones in a storage area corresponding to the second sub-zone among the plurality of storage areas.

In one or more embodiments, the storage controller 900 may set the plurality of storage areas based on the wear level of the memory blocks. For example, the storage controller 900 may divide the first zone (ZONE1) into a plurality of storage areas based on the wear level of the memory blocks included in the first zone (ZONE1). Memory blocks whose wear level is less than or equal to the first reference value may be allocated to the storage area of the first wear level (WEAR-LEVEL1), memory blocks whose wear level exceeds the second reference value may be allocated to the storage area of the third wear level (WEAR-LEVEL 3), and memory blocks whose wear level exceeds the first reference value and is less than or equal to the second reference value may be allocated to the storage area of the second wear level (WEAR-LEVEL 2). The storage controller 900 may store data of the sub-zones in a plurality of storage areas with different wear levels corresponding to the sub-zones, based on information about the sub-zones. For example, when the number of read requests in the first sub-zone is greater than the number of write requests, and the difference between the number of read requests and the number of write requests exceeds a threshold (for example, 100), the storage controller 900 may store the data of the first sub-zone in a storage area with a relatively high wear level (that is, the third wear level (WEAR-LEVEL 3)). For example, when the number of write requests in the second sub-zone is greater than the number of read requests, and the difference between the number of write requests and the number of read requests exceeds a threshold (for example, 100), the storage controller 900 may store the data of the second sub-zone in a storage area with a relatively low wear level (that is, the first wear level (WEAR-LEVEL 1)). In the embodiments, the storage controller 900 may set the plurality of zones based on the wear level of the memory blocks. The plurality of zones may include different numbers of the memory blocks with relatively low wear levels depending on the grade. For example, a first-grade zone may include a first number of the memory blocks with a relatively low wear level, and a second number of the memory blocks with a relatively high wear level that is smaller than the first number. A second-grade zone may include the second number of the memory blocks with a relatively low wear level, and the first number of the memory blocks with a relatively high wear level. In one or more embodiments, when the storage controller 900 receives data from the first zone with a relatively high grade, and the number of read requests in the first sub-zone of the first zone is greater than the number of write requests and the difference between the number of read requests and the number of write requests exceeds the threshold, the storage controller 900 may store data of the first sub-zone of the first zone in the first-grade zone. When the storage controller 900 receives data from the second zone with a relatively low grade, and the number of read requests in the second sub-zone of the first zone is greater than the number of write requests and the difference between the number of read requests and the number of write requests exceeds the threshold, the storage controller 900 may store data of the first sub-zone of the second zone in the second-grade zone. That is, even if the difference between the number of read requests and the number of write requests of the first sub-zone in each of the first zone and the second zone is the same, due to the grade difference between the first zone and the second zone, the data in the first sub-zone of the first zone may be stored in the first grade zone including more memory blocks with relatively low wear levels, and the data in the first sub-zone of the second zone may be stored in the second-grade zone including fewer memory blocks with relatively low wear levels.

Figure 15:
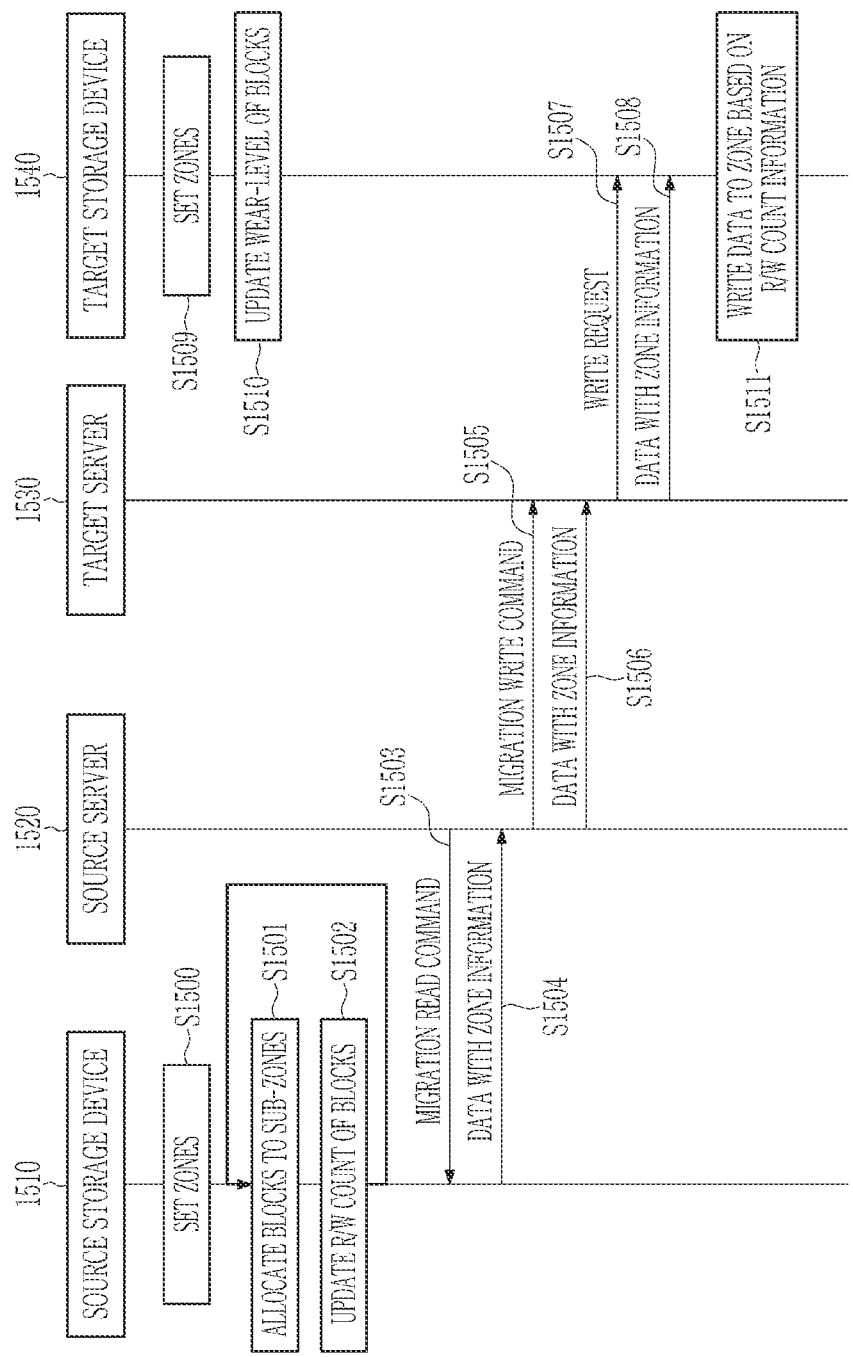
FIG. 15 illustrates a flowchart of a data migration method of a storage system according to an embodiment.

FIG. 15 illustrates a flowchart of a data migration method of a storage system according to an embodiment.

Referring to FIG. 15, a source storage device 1510 sets a plurality of zones (S1500). The source storage device 1510 may set a plurality of zones including at least one memory block in the non-volatile memory. In one or more embodiments, the source storage device 1510 may set the plurality of zones so that the number of memory blocks included in each of the plurality of zones is the same or different.

The source storage device 1510 sets a plurality of sub-zones in each of the plurality of zones, and allocates the memory blocks to the plurality of sub-zones based on the read/write counts of the memory blocks (S1501). The source storage device 1510 may set a read-intensive first sub-zone and a write-intensive second sub-zone to each of the plurality of zones. The source storage device 1510 may allocate the memory blocks to the first sub-zone or second sub-zone based on the read/write counts of each of the memory block in the non-volatile memory. For example, the source storage device 1510 may check the read/write counts of each of the memory blocks from the R/W table (921 in FIG. 9), and may divides the memory blocks to the first sub-zone or second sub-zone based on the read/write count. The source storage device 1510 may store information about the plurality of zones in the zone management table (923 in FIG. 9). For example, information about the plurality of zones includes information about the size of sub-zones included in each of the plurality of zones, the memory blocks included in the sub-zones, and the read/write count for the sub-zones. In one or more embodiments, the source storage device 1510 may set a plurality of sub-zones so that the number of the memory blocks included in the plurality of sub-zones set in each of the plurality of zones is the same or different.

The source storage device 1510 updates the read/write counts of the memory blocks (S1502). The source storage device 1510 may update the read/write counts of each of the memory blocks based on the number of read/write requests received for each of the memory blocks. For example, when a read or write request for a word line or page included in the first memory block is received, the R/W manager (931 in FIG. 9) of the source storage device 1510 may updates the R/W table 921 by increasing the number of receptions of a read request or write request corresponding to the first memory block of the R/W table 921 stored in the memory (920 in FIG. 9).

A source server 1520 transmits a migration read command to the source storage device 1510 (S1503). The source server 1520 may migrate data stored in the source storage device 1510 to a target storage device 1540 in response to user requests and changes in the network environment. The migration manager (213 in FIG. 2) of the source server 1520 may generate a migration read command for reading data stored in the source storage device 1510. The migration manager 213 may transmit the migration read command and the address of data to be migrated to the source storage device 1510.

The source storage device 1510 transmits data to be migrated and information about a zone in which the data is stored to the source server 1520 according to the migration command (S1504). The R/W manager 931 of the source storage device 1510 may read information about a zone in which user data to be migrated is stored from the zone management table 923 of the memory 920. The source storage device 1510 may read user data to be migrated from the non-volatile memory and transmit the data and zone information to the source server 1520.

The source server 1520 transmits a migration write command to a target server 1530 (S1505). In addition, the source server 1520 transmits the data and zone information to the target server 1530 (S1506).

The target server 1530 generates a write request according to the migration write command and transmits the write request to the target storage device 1540 (S1507). In addition, the target server 1530 transmits the data and zone information to the target storage device 1540 (S1508). In one or more embodiments, the source server 1520 may directly transmit the migration write command and the data and zone information to the target storage device 1540.

The target storage device 1540 may set a plurality of zones (S1509). The target storage device 1540 may set a plurality of zones including at least one memory block in the non-volatile memory.

The target storage device 1540 may update a wear level of the memory blocks (S1510). For example, the wear leveling manager (950 in FIG. 9) of the target storage device 1540 may count the P/E cycle for each memory block, and may store the P/E cycle for each memory block in the memory 920 in a table format.

The target storage device 1540 stores data in the zone based on the zone information and the wear level of the memory blocks (S1511). The target storage device 1540 may classify memory blocks included in a zone set in the non-volatile memory of the target storage device 1540 by a wear level. The target storage device 1540 may store data in a memory block(s) having a corresponding wear level within a set zone by referring to information on the received zone. For example, the target storage device 1540 may store data stored in a read-intensive sub-zone in a memory block with a relatively high wear level within the zone, based on the read/write count information for each of the sub-zones among the zone information, and may store data stored in a write-intensive sub-zone in a memory block with a relatively low wear level within the zone. Therefore, even when data migration is performed between different storage devices, wear leveling may be performed with reference to attribute information about the data. Operation (S1508) will be described with reference to FIG. 16.

Figure 16:
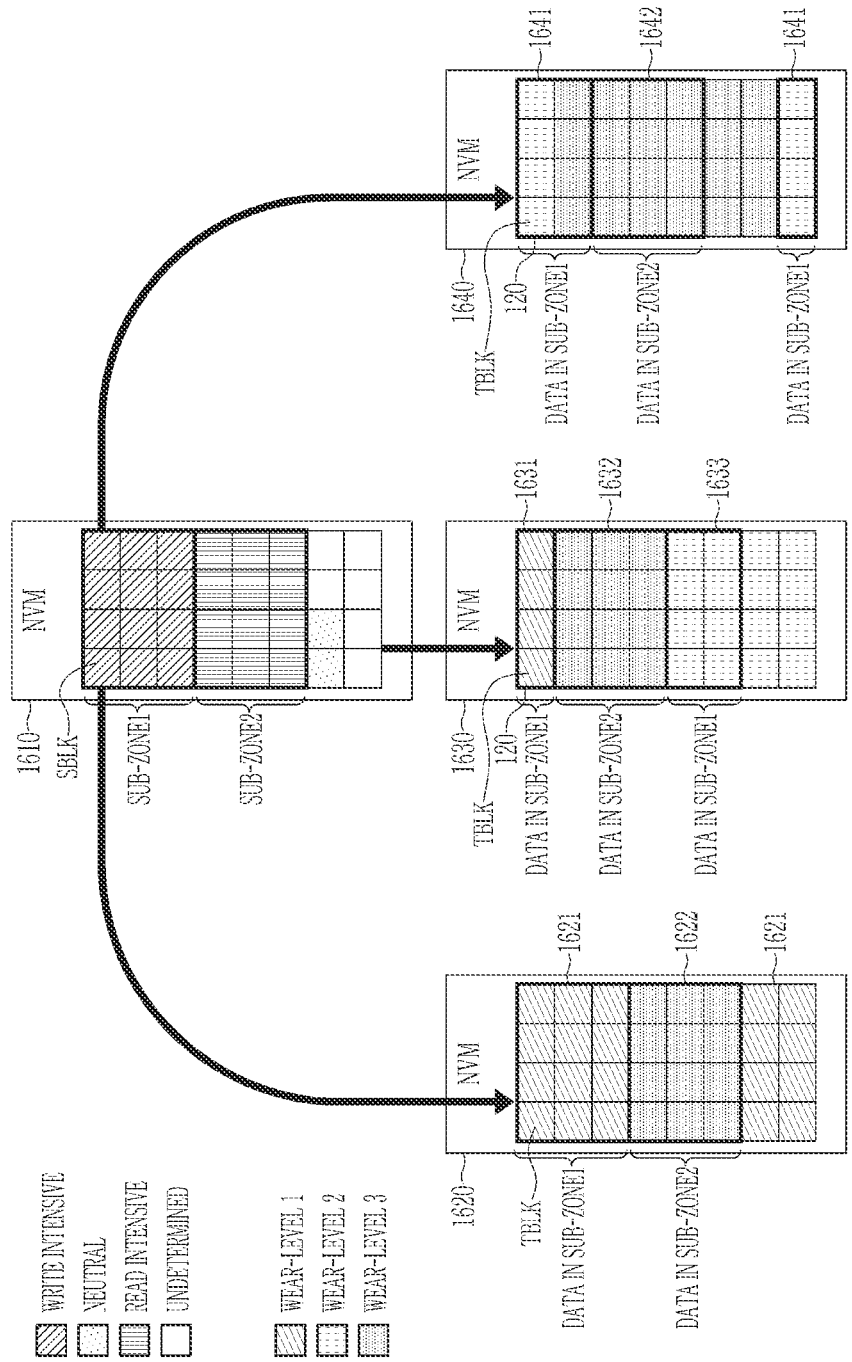
FIG. 16 illustrates a block diagram of a data migration process of a storage system according to an embodiment.

FIG. 16 illustrates a block diagram of a data migration process of a storage system according to an embodiment.

Referring to FIG. 16, data stored in a non-volatile memory 1610 of the source storage device may be migrated to non-volatile memories 1620, 1630, and 1640 of the target story device. Data stored in a first zone (ZONE1) of the non-volatile memory 1610 may be migrated to zones (ZONE2, ZONE3, and ZONE4) of the non-volatile memories 1620, 1630, and 1640 of the target story device.

The first zone (ZONE1) of the non-volatile memory 1610 may include a plurality of memory blocks SBLK with a plurality of read/write levels (WRITE INTENSIVE, NEUTRAL, READ INTENSIVE, and UNDETERMINED). The first zone (ZONE1) may include a plurality of sub-zones (SUB-ZONE1 and SUB-ZONE2). The first sub-zone (SUB-ZONE1) may include memory blocks SBLK having the first level (WRITE INTENSIVE) among the plurality of memory blocks SBLK, and the second sub-zone (SUB-ZONE2) may include memory blocks SBLK having the third level (READ INTENSIVE) among the plurality of memory blocks SBLK. In one or more embodiments, the first sub-zone (SUB-ZONE1) and the second sub-zone (SUB-ZONE2) may further include memory blocks SBLK having the second level (NEUTRAL) and/or memory blocks SBLK having the fourth level (UNDETERMINED), among the plurality of memory blocks SBLK.

In the embodiment, data stored in the first zone (ZONE1) may be migrated to the zones (ZONE2, ZONE3, and ZONE4). Data stored in the first sub-zone (SUB-ZONE1) including memory blocks with the first level (WRITE INTENSIVE) focused on writing may be migrated to memory blocks with a wear level indicating a state in which deterioration is less advanced within the zone (ZONE2, ZONE3, and ZONE4). Data stored in the second sub-zone (SUB-ZONE2) including memory blocks with the third level (READ INTENSIVE) focused on reading may be migrated to memory blocks with a wear level indicating a state in which deterioration is more advanced within the zone (ZONE2, ZONE3, and ZONE4).

The non-volatile memory 1620, 1630, and 1640 of the target storage device may include a plurality of zones, and each of the plurality of zones may include a plurality of memory blocks TBLK having a plurality of wear levels (WEAR-LEVEL 1, 2, and 3).

In one or more embodiments, the target storage device may perform data migration to the second zone (ZONE2) of the plurality of zones in the non-volatile memory 1620. When data migration is performed in the second zone (ZONE2), data (DATA IN SUB-ZONE1) stored in the first sub-zone (SUB-ZONE1) may be stored in memory blocks 1621 having the first wear level (WEAR-LEVEL 1) indicating a state in which deterioration is less advanced corresponding to the first level (WRITE INTENSIVE) focused on writing. Data (DATA IN SUB-ZONE2) stored in the second sub-zone (SUB-ZONE2) may be stored in memory blocks 1622 having the third wear level (WEAR-LEVEL 3) indicating a state in which deterioration is more advanced corresponding to the third level (READ INTENSIVE) focused on reading.

In one or more embodiments, the target storage device may perform data migration to the third zone (ZONE3) of the plurality of zones in the non-volatile memory 1630. The third zone (ZONE3) may include a plurality of memory blocks (TBLK) having the plurality of wear levels (WEAR-LEVEL 1, 2, and 3).

When data migration is performed in the third zone (ZONE3), the data (DATA IN SUB-ZONE1) stored in the first sub-zone (SUB-ZONE1) may be stored in memory blocks 1631 having the first wear level (WEAR-LEVEL 1) indicating a state in which deterioration is less advanced corresponding to the first level (WRITE INTENSIVE) focused on writing and memory blocks 1633 having the second wear level (WEAR-LEVEL 2) indicating a state in which deterioration is more advanced than the first wear level (WEAR-LEVEL 1). That is, the data (DATA IN SUB-ZONE1) is first stored in memory blocks 1631 having the first wear level (WEAR-LEVEL 1), and then the data (DATA IN SUB-ZONE1) may be stored in the memory blocks 1633 having the wear level (WEAR-LEVEL 2). Data (DATA IN SUB-ZONE2) stored in the second sub-zone (SUB-ZONE2) may be stored in memory blocks 1632 having the third wear level (WEAR-LEVEL 3) indicating a state in which deterioration is more advanced corresponding to the third level (READ INTENSIVE) focused on reading.

In one or more embodiments, the target storage device may perform data migration to the fourth zone (ZONE4) of the plurality of zones in the non-volatile memory 1640. The fourth zone (ZONE4) may include a plurality of memory blocks TBLK with a plurality of wear levels (WEAR-LEVEL 2 and 3) excluding the first wear level (WEAR-LEVEL 1).

When data migration is performed in the fourth zone (ZONE4), the data (DATA IN SUB-ZONE1) stored in the first sub-zone (SUB-ZONE1) may be stored in memory blocks 1641 having the second wear level (WEAR-LEVEL 2) indicating a state in which deterioration is less advanced corresponding to the first level (WRITE INTENSIVE) focused on writing and memory blocks 1642 having the third wear level (WEAR-LEVEL 3). That is, the data (DATA IN SUB-ZONE1) is first stored in memory blocks 1641 having the second wear level (WEAR-LEVEL 2), and then the data (DATA IN SUB-ZONE1) may be stored in the memory blocks 1642 having the wear level (WEAR-LEVEL 3). Data (DATA IN SUB-ZONE2) may be stored in memory blocks 1642 having the third wear level (WEAR-LEVEL 3) indicating a state in which deterioration is more advanced corresponding to the third level (READ INTENSIVE) focused on reading.

According to the embodiment, the data stored in the memory blocks focused on reading may be migrated to the memory blocks with a higher wear level, that is, the more deteriorated memory blocks, and the data stored in the memory blocks focused on writing may be migrated to the memory blocks with a lower wear level, that is, the less deteriorated memory blocks. Therefore, wear leveling may be performed even when migrating data between servers.

Figure 17:
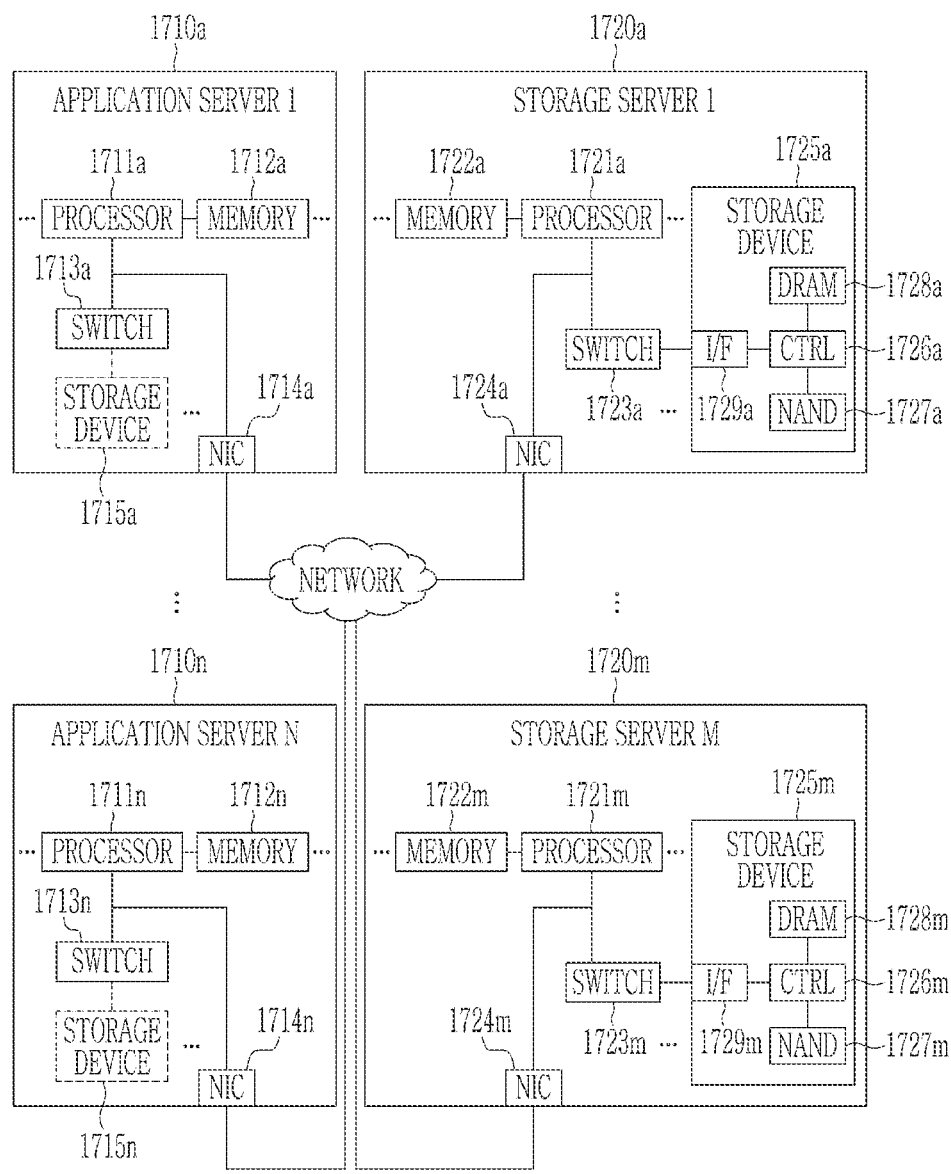
FIG. 17 illustrates a block diagram of a data center to which a storage system according to an embodiment is applied.

FIG. 17 illustrates a block diagram of a data center to which a storage system according to an embodiment is applied.

Referring to FIG. 17, a data center 1700 is a facility that collects various data and provides a service, and may be referred to as a data storage center. The data center 1700 may be a system for operating a search engine and database, and may be a computing system used in a business or government institution such as a bank. The data center 1700 may include application servers (1710a, . . . , 1710n) and storage servers (1720a, . . . , 1720h). The number of the application servers (1710a, . . . , 1710n) and the number of the storage servers (1720a, . . . , 1720m) may be variously selected depending on embodiments, and the number of the application servers (1710a, . . . , 1710n) and the number of the storage servers (1720a, . . . , 1720m) may be different.

The application server 1710 or the storage server 1720 may include at least one of processors 1711 and 1721 and memories 1712 and 1722. When the storage server 1720 is described as an example, the processor 1721 may control an overall operation of the storage server 1720, and may access the memory 1722 to execute commands and/or data loaded into the memory 1722. The memory 1722 may be a double data rate synchronous DRAM (DDR SDRAM), a high bandwidth memory (HBM), a hybrid memory cube (HMC), a dual in-line memory module (DIMM), an optane DIMM, or a non-volatile DIMM (NVMDIMM). In one or more embodiments, the number of the processors 1721 and memories 1722 included in the storage server 1720 may be variously selected. In the embodiment, the processor 1721 and the memory 1722 may provide a processor-memory pair. In the embodiment, the number of the processors 1721 and the number of the memories 1722 may be different. The processor 1721 may include a single-core processor or a multi-core processor. The above description of the storage server 1720 may be similarly applied to the application server 1710. In one or more embodiments, the application server 1710 may not include a storage device 1715. The storage server 1720 may include at least one storage device 1725. The number of storage devices 1725 included in the storage server 1720 may be variously selected depending on embodiments.

The application servers (1710a, . . . , 1710n) and the storage servers (1720a, . . . , 1720m) may communicate with each other through a network 1730. The network 1730 may be implemented using a fiber channel (FC) or Ethernet. In this case, the FC is a medium used for relatively high-speed data transmission, and may use an optical switch that provides high performance/high availability. Depending on an access method of the network 1730, the storage servers (1720a, . . . , 1720m) may be provided as a file storage, a block storage, or an object storage.

In the embodiment, the network 1730 may be a storage-only network, such as a storage area network (SAN). For example, the SAN may be an FC-SAN that uses an FC network and is implemented according to FC protocol (FCP). As another example, the SAN may be an IP-SAN that uses a TCP/IP network and is implemented according to an iSCSI (SCSI over TCP/IP or Internet SCSI) protocol. In another embodiment, the network 1730 may be a general network such as a TCP/IP network. For example, the network 1730 may be implemented according to protocols such as FC over Ethernet (FCOE), network attached storage (NAS), and NVMe over fabrics (NVMe-oF).

Hereinafter, the application server 1710 and the storage server 1720 will be mainly described. The description of the application server 1710 may also be applied to another application server 1710n, and the description of the storage server 1720 may also be applied to another storage server 1720m.

The application server 1710 may store data requested by a user or client to be stored in one of the storage servers (1720a, . . . , 1720m) through the network 1730. In addition, the application server 1710 may obtain data requested to be read by a user or client from one of the storage servers (1720a, . . . , 1720m) through the network 1730. For example, the application server 1710 may be implemented as a web server or database management system (DBMS).

The application server 1710 may access a memory 1712n or storage device 1715n included in another application server 1710n through the network 1730, or may access memories (1722a, . . . , 1722m) or storage servers (1725a, . . . 1725m) included in the storage servers (1720a, . . . , 1720m) through the network 1730. Accordingly, the application server 1710 may perform various operations on data stored in the application servers (1710a, . . . , 1710n) and/or the storage servers (1720a, . . . , 1720m). For example, the application server 1710 may execute commands to move or copy data between the application servers (1710a, . . . , 1710n) and/or the storage servers (1720a, . . . , 1720m). In this case, data may be moved from the storage devices (1725a, . . . , 1725m) of the storage servers (1720a, . . . , 1720m) through the memories (1722a, . . . , 1722m) of the storage servers (1720a, . . . , 1720m) or immediately to the memories (1712a, . . . , 1712n) of the application servers (1710a, . . . , 1710n). Data moving through the network 1730 may be encrypted data for security or privacy.

When the storage server 1720 is described as an example, an interface circuit 1729 may provide a physical connection between the processor 1721 and a controller 1726 and a physical connection between an NIC 1724 and the controller 1726. For example, the interface circuit 1729 may be implemented by a direct attached storage (DAS) method that directly connects the storage device 1725 with a dedicated cable. In addition, for example, the interface circuit 1729 may be implemented by various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an IEEE 1394, a universal serial bus (USB), a secure digital (SD) card, a multi-media card (MMC), an embedded multi-media card (eMMC), a universal flash storage (UFS), an embedded universal flash storage (eUFS), and a compact flash (CF) card.

The storage server 1720 may further include a switch 1723 and a NIC 1724. The switch 1723 may selectively connect the processor 1721 and the storage device 1725 or selectively connect the NIC 1724 and the storage device 1725 according to the control of the processor 1721. Similarly, the application server 1710 may further include a switch 1713 and a NIC 1714.

In the embodiment, the NIC 1724 may include a network interface card, a network adapter, and the like. The NIC 1724 may be connected to the network 1730 by a wired interface, a wireless interface, a Bluetooth interface, an optical interface, or the like. The NIC 1724 may include an internal memory, a DSP, a host bus interface, and the like, and may be connected to the processor 1721 and/or the switch 1723 through the host bus interface. The host bus interface may be implemented as one of the examples of the interface circuit 1729 described above. In the embodiment, the NIC 1724 may be integrated with at least one of the processor 1721, the switch 1723, and the storage device 1725.

In the storage servers (1720a, . . . , 1720m) or application servers (1710a, . . . , 1710n), the processor may program or read data by transmitting a command to storage devices (1715a, . . . , 1715n, 1725a, . . . , 1725m) or memories (1712a, . . . , 1712n, 1722a, . . . , 1722m). In this case, the data may be error-corrected data through an error correction code (ECC) engine. The data is data that has been processed through data bus inversion (DBI) or data masking (DM), and may include cyclic redundancy code (CRC) information. The data may be encrypted for security or privacy.

The storage devices (1725*a*, . . . , 1725*m*) may transmit a control signal and a command/address signal to NAND flash memory devices (1727*a*, . . . , 1727*m*) in response to the read command received from the processor. Accordingly, when reading data from the NAND flash memory devices (1727*a*, . . . , 1727*m*), a read enable (RE) signal may be inputted as a data output control signal and may serve to output data to a DQ bus. Data strobe (DQS) may be generated using the RE signal. Commands and address signals may be latched into the page buffer depending on a rising or falling edge of a write enable (WE) signal.

The controller 1726 may control the overall operation of the storage device 1725. In the embodiment, the controller 1726 may include a static random access memory (SRAM). The controller 1726 may write data to the NAND flash 1727 in response to a write command, or read data from the NAND flash 1727 in response to a read command. For example, the write command and/or the read command may be provided from the processor 1721 in the storage server 1720, the processor 1721*m* in another storage server 1720*m*, or the processors (1711*a*, . . . , 1711*n*) in the application servers (1710*a*, . . . , 1710*n*). The DRAM 1728 may temporarily store (buffer) data to be written to the NAND flash 1727 or data read from the NAND flash 1727. In addition, the DRAM 1728 may store meta data. Here, the meta data is data generated by the controller 1726 to manage user data or the NAND flash 1727.

The storage devices (1725*a*, . . . , 1725*m*) may be implemented based on the storage devices according to the embodiments of the present disclosure described above with reference to FIG. 1 to FIG. 16, and may be implemented to perform the driving method according to the embodiments of the present disclosure.

The storage devices (1725*a*, . . . , 1725*m*) may transmit the data to be migrated and the attribute information of the memory block in which the data is stored to the target storage servers (1720*a*, . . . , 1720*m*), according to the migration read request. In one or more embodiments, the storage devices (1725*a*, . . . , 1725*m*) may transmit zone unit data and zone information to the target storage servers (1720*a*, . . . , 1720*m*), according to the migration read request.

The storage devices (1725*a*, . . . , 1725*m*) may receive data and attribute information of the memory block in which the data is stored according to the migration write request, and store the data to be migrated in a memory block having a wear level corresponding to the attribute information. In one or more embodiments, the storage devices (1725*a*, . . . , 1725*m*) may receive zone unit data and zone information according to the migration write request, and may store the zone unit data in a memory block with a corresponding wear level based on the zone information.

The embodiments of the present disclosure may be usefully used in a storage device and an electronic device and system including the same. For example, the embodiments of the present disclosure may be more usefully applied to electronic systems such as a personal computer, a server computer, a data center, a workstation, a laptop, a cellular phone, a smart phone, an MP3 player, a personal digital assistant (PDA), a portable multimedia player (PMP), a digital TV, a digital camera, a portable game console, a navigation device, a wearable device, an IoT (Internet of Things) device, an IoE (Internet of Everything) device, an e-book, a virtual reality (VR) device, an augmented reality (AR) device, and a drone.

While the embodiment of the present disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A method of migrating data, from a source storage device to a target storage device, the method comprising:
receiving data, read count information about the data, and write count information about the data from the source storage device;
selecting at least one memory block among a plurality of memory blocks in the target storage device based on a wear level of the plurality of memory blocks and the read count information and the write count information; and
storing the data in the at least one memory block.

2. The method of claim 1, further comprising:
allocating the plurality of memory blocks to a plurality of zones,
wherein the receiving the data, the read count information, and the write count information comprises:
receiving data stored in a first zone among the plurality of zones,
receiving read count information about the data stored in the first zone, and
receiving write count information about the data stored in the first zone, and
wherein the storing the data in the at least one memory block further comprises:
storing the data stored in the first zone in a second zone among the plurality of zones.

3. The method of claim 2, wherein the first zone comprises a plurality of sub-zones,
wherein the read count information of the data stored in the first zone comprises information about a read count of data stored in each sub-zone of the plurality of sub-zones, and
wherein the write count information for the data stored in the first zone comprises information about a write count of data stored in each sub-zone of the plurality of sub-zones.

4. The method of claim 3, wherein the storing the data stored in the first zone further comprises, for each respective sub-zone of the plurality of sub-zones:
comparing the read count of the data stored in a respective sub-zone and the write count of the data stored in a respective sub-zone; and
based on identifying that the read count of the data stored in the respective sub-zone is greater than the write count of the data stored in the respective sub-zone, storing the data of the respective sub-zone in at least one memory block among the plurality of memory blocks having a high wear level, wherein the high wear level is greater than a predetermined level, and
based on identifying that the read count of the data stored in the respective sub-zone is less than the write count of the data stored in the respective sub-zone, storing the data of the respective sub-zone in at least one memory block among the plurality of memory blocks having a low wear level, wherein the low wear level is less than the predetermined level.

5. The method of claim 4, wherein the storing the data of the respective sub-zone in the at least one memory block having the high wear level further comprises storing the data of the respective sub-zone in at least one memory block having a first wear level and at least one memory block having a second wear level corresponding to a state in which deterioration is less advanced compared to the first wear level, wherein the at least one memory block having the first wear level is included in the second zone.

6. The method of claim 4, wherein the storing the data of the respective sub-zone in the at least one memory block having the low wear level further comprises storing the data of the respective sub-zone in at least one memory block having a first wear level and at least one memory block having a second wear level corresponding to a state in which deterioration is more advanced compared to the first wear level, wherein the at least one memory block having the first wear level is included in the second zone.

7. The method of claim 1, wherein the storing the data comprises:
    comparing a read count and a write count based on the read count information about the data and the write count information about the data;
    based on identifying that the read count is greater than the write count, storing the data in at least one memory block among the plurality of memory blocks having a high wear level, wherein the high wear level is greater than a predetermined level; and
    based on identifying that the read count is less than the write count, storing the data in at least one memory block among the plurality of memory blocks having a low wear level, wherein the low wear level is less than the predetermined level.

8. The method of claim 1, further comprising:
    determining the wear level of the plurality of memory blocks based on a program/erase cycle of the plurality of memory blocks.

9. A method of operating a storage device, the method comprising:
    setting a plurality of zones;
    setting a plurality of sub-zones to each zone of the plurality of zones;
    allocating, based on read counts and write counts of a plurality of memory blocks, the plurality of memory blocks to the plurality of sub-zones;
    storing information about the read counts and the write counts corresponding to each of the plurality of sub-zones in a zone management table;
    receiving a data migration request for at least one zone of the plurality of zones; and
    transmitting data stored in the at least one zone and information about the read counts and the write counts of the plurality of sub-zones of the at least one zone from the zone management table.

10. The method of claim 9, wherein the allocating the plurality of memory blocks to the plurality of sub-zones comprises:
    identifying each memory block of the plurality of memory blocks as corresponding to one of a plurality of read/write levels based on the read counts and the write counts, wherein the plurality of read/write levels comprise a read intensive level and a write intensive level;
    based on identifying at least one memory block among the plurality of memory blocks as corresponding to the read intensive level, allocating the at least one memory block corresponding to the read intensive level to a first sub-zone among the plurality of sub-zones; and
    based on identifying at least one memory block among the plurality of memory blocks as corresponding to the write intensive level, allocating the at least one memory block corresponding to the write intensive level to a second sub-zone among the plurality of sub-zones.

11. The method of claim 10, wherein the allocating the plurality of memory blocks to the plurality of sub-zones further comprises:
    allocating at least one memory block, among the plurality of memory blocks, that is not determined to correspond to the read intensive level or the write intensive level to the first sub-zone and the second sub-zone.

12. The method of claim 10, wherein the storing information in the zone management table further comprises:
    storing a size of each of the plurality of sub-zones, an identifier corresponding to at least one memory block included in each of the plurality of sub-zones, and the read count and the write count corresponding to each of the plurality of sub-zones.

13. The method of claim 9, wherein the setting of the plurality of sub-zones comprises configuring the plurality of sub-zones to have a same size.

14. The method of claim 9, wherein one of the plurality of zones comprises a plurality of memory blocks included in a plurality of non-volatile memories.

15. A storage system comprising:
    a source storage device comprising a plurality of memory blocks, wherein the source storage device is configured to:
        allocate the plurality of memory blocks into a plurality of zones,
        allocate each of the plurality of zones into a plurality of sub-zones, and
        transmit information about data stored in one zone of the plurality of zones, and
    read counts and write counts of the plurality of sub-zones of the one zone; and
    a source storage server configured to transmit to a target storage device the information about the data stored in the one zone, and the read counts and the write counts of the plurality of sub-zones of the one zone.

16. The storage system of claim 15, wherein the source storage device is further configured to:
    allocate one or more memory blocks, among the plurality of memory blocks, allocated into the one zone to each of the plurality of sub-zones of the one zone based on the read counts and the write counts of the plurality of sub-zones of the one zone, and
    store information about the read counts and write counts of the plurality of sub-zones of the one zone in a zone management table.

17. The storage system of claim 16, wherein the source storage device is further configured to:
    identify the one or more memory blocks, from among the plurality of memory blocks allocated into the one zone as one of a plurality of read/write levels based on read counts and write counts of the one or more memory blocks, wherein the plurality of read/write levels comprise a read intensive level and a write intensive level,
    based on identifying at least one memory block among the one or more memory blocks allocated into the one zone as corresponding to the read intensive level, allocate the at least one memory block corresponding to the read intensive level to a first sub-zone among the plurality of sub-zones, and
    based on identifying at least one memory block among the one or more memory blocks allocated into the one zone as corresponding to the write intensive level, allocate the at least one memory block corresponding to the read intensive level to a second sub-zone among the plurality of sub-zones.

18. The storage system of claim 16, wherein the source storage device is further configured to:
divide the plurality of zones into a plurality of grades, and
store information about the plurality of grades in the zone management table.

19. The storage system of claim 18, wherein a number of memory blocks, among the plurality of memory blocks, corresponding to a relatively low wear level included in a zone, among the plurality of zones, corresponding to a first grade among a plurality of grades is different from a number of memory blocks, among the plurality of memory blocks, corresponding to the relatively low wear level included in a zone, among the plurality of zones, corresponding to a second grade among the plurality of grades.

20. The storage system of claim 15, wherein one of the plurality of zones comprises a plurality of memory blocks included in a plurality of non-volatile memories.

* * * * *